US009540244B2

(12) United States Patent
Zhang et al.

(10) Patent No.: US 9,540,244 B2
(45) Date of Patent: Jan. 10, 2017

(54) METHODS FOR SYNTHESIZING GRAPHENE FROM A LIGNIN SOURCE

(71) Applicant: Mississippi State University, Starkville, MS (US)

(72) Inventors: Jilei Zhang, Starkville, MS (US); Zhiyong Cai, Madison, WI (US)

(73) Assignees: Mississippi State University, Starkville, MS (US); The United States of America as Represented by Secretary of Agriculture, Washington, DC (US)

( * ) Notice: Subject to any disclaimer, the term of this patent is extended or adjusted under 35 U.S.C. 154(b) by 0 days.

(21) Appl. No.: 14/297,275

(22) Filed: Jun. 5, 2014

(65) Prior Publication Data

US 2015/0307356 A1    Oct. 29, 2015

Related U.S. Application Data

(60) Provisional application No. 61/831,297, filed on Jun. 5, 2013.

(51) Int. Cl.
*C01B 3/04* (2006.01)
*C01B 31/04* (2006.01)

(52) U.S. Cl.
CPC ................................ *C01B 31/0446* (2013.01)

(58) Field of Classification Search
CPC .. C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32

USPC ......................................................... 423/448
See application file for complete search history.

(56) References Cited

U.S. PATENT DOCUMENTS

| | | | | |
|---|---|---|---|---|
| 6,057,262 | A | * | 5/2000 | Derbyshire et al. ........... 502/423 |
| 6,562,191 | B1 | * | 5/2003 | Rousu ....................... D21C 3/20 162/38 |
| 2005/0085372 | A1 | * | 4/2005 | Spradling et al. ............... 501/99 |
| 2008/0188636 | A1 | | 8/2008 | Argyropoulos et al. |
| 2013/0074757 | A1 | | 3/2013 | McAlister |
| 2014/0227162 | A1 | * | 8/2014 | Joh et al. ....................... 423/448 |
| 2015/0307356 | A1 | * | 10/2015 | Zhang ................. C01B 31/0446 423/448 |

FOREIGN PATENT DOCUMENTS

| | | |
|---|---|---|
| EP | 2326503 A1 | 6/2011 |
| EP | 2457978 A1 | 5/2012 |
| JP | 2012206924 A2 | 10/2012 |

OTHER PUBLICATIONS

Kubo, et al., Catalytic graphitization of hardwood acetic acid lignin with nickel acetate, J. Wood. Sci. 2003; 49: 188-192.*

(Continued)

*Primary Examiner* — Daniel C McCracken
(74) *Attorney, Agent, or Firm* — Stites & Harbison PLLC; Richard S. Myers, Jr.

(57) ABSTRACT

Embodiments of the presently-disclosed subject matter include methods for synthesizing carbon nanomaterials from a lignin and/or source thereof. Exemplary methods comprise a process of thermal treating a lignin and/or source thereof in the presence of a catalyst to synthesize graphene nanosheets.

20 Claims, 21 Drawing Sheets

(56) References Cited

OTHER PUBLICATIONS

Examination Guidelines for Determining Obviousness Under 35 U.S.C. 103 in View of the Supreme Court Decision in *KSR International Co.* v. *Teleflex Inc.*, 72 Fed. Reg. 57526 (Oct. 10, 2007).*

Examination Guidelines Update: Developments in the Obviousness Inquiry After *KSR* v. *Teleflex*, 75 Fed. Reg. 53643 (Sep. 1, 2010).*

Fitzer, et al., Recommended Terminology for the Description of Carbon as a Solid, Pure & Appl. Chem. 1995; 67(3): 473-506.*

Oya, et al., Review Phenomena of catalytic graphitization, Journal of Materials Science 1982; 17: 309-322.*

Oya, et al., Catalytic graphitization of carbons by various metals, Carbon 1979; 17(2): 131-137.*

Hirokazu, et al.; Conversion of lignocellulose into renewable chemicals by heterogeneous catalysis; Catalysis Science & Technology; 2012; 2; pp. 869-883.

Brebu, M., Vasile, C., 2010. Thermal degradation of lignin—a review. Cellulose Chem. Technol., 44, 353-363.

Brebu, M., Cazacu, G., Chirila, O., 2011. Pyrolysis of lignin—a potential method for obtaining chemicals and/or fuels. Cellulose Chem. Technol., 45, 43-50.

Caballero, J.A., Font, R., Marcilla A., 1996. Study of the primary pyrolysis of Kraft lignin at high heating rates: yields and kinetics. J. Anal. Appl. Pyrol., 36, 159-178.

Cao, J., Xiao, G., Xu, X., Shen, D.K., Jin, B.S., 2013. Study on carbonization of lignin by TG-FTIR and high-temperature carbonization reactor. Fuel Processing Technol., 106, 41-47.

Cordero, T., Rodriguez-Maroto, J.M., Rodriguez-Mirasol, J., Rodriguez J.J., 1990. On the kinetics of thermal decomposition of wood and wood components. Thermpchim. Acta, 164, 135-144.

Gao, Y., Yue, Q.Y., Gao, B.Y., Sun, Y.Y., Wang, W.Y., Li, Q., Wang, Y., 2013. Preparation of high surface area-activated carbon from lignin of papermaking black liquor by KOH activation for Ni(II) adsorption. Chem. Eng. J., 217, 345-353.

Gonzalez-Serrano, E., Cordero, T., Rodriguez-Mirasol, J., Rodriguez J.J., 1997. Development of porosity upon chemical activation of kraft lignin with ZnCl2. Ind. Eng. Chem. Res., 36, 4832-4838.

Hu, J., Xiao, R., Shen, D.K., Zhang, H.Y., 2013. Structual analysis of lignin residue from black liquor and its thermal performance in thermogravimetric-fourier transform infrared spectroscopy. Bioresour. Technol., 128, 633-639.

Jones L.E., Thrower, P.A.: 1991. Influence of boron on carbon fiber microstructure, physical properties, and oxidation behavior. Carbon, 29, 251-269.

Kumar, M.N.S., Mohanty, A.K., Erickson, L., Misra, M., 2009. Lignin and its applications with polymers. Journal of BiobasedMaterials and Bioenergy, 3, 1-24.

Mun, S.P., Cai, Z.Y., Zhang J.L., 2013. Fe-catalyzed thermal conversion of sodium lignosulfonate to graphene. Materials Letters, 100, 180-183.

Liou, Y.J., Huang, W.J., 2013. Quantitative analysis of graphene sheet content in wood char powders during catalytic pyrolysis. J. Mater. Sci. Technol., 29, 406-410.

Lora, J.H., Glasser, W.G., 2002. Recent industrial applications of lignin: a sustainable alternative to non-renewable materials. J. Polym. Environ. 10, 39-48.

Qin, W., Kadla, J.F., 2012. Carbon fibers based on pyrolytic lignin. J. Appl. Polym. Sci. 126, E203-E212.

Rodríguez-Mirasol, J., Cordero, T., Rodríguez, J.J., 1996. High-temperature carbons from kraft lignin. Carbon, 34, 43-52.

Sharma, R.K., Wooten, J.B., Baliga, V.L., Lin, X.H., 2004. Characterization of chars from pyrolysis of lignin. Fuel, 83, 1469-1482.

Stewart D., 2008. Lignin as a base material for materials applications: chemistry, application and economics. Ind. Crop. Prod., 27, 202-207.

Suhas; Carrott, P.J.M., Ribeiro Carrott, M.M.L., 2007. Lignin—from natural adsorbent to activated carbon: a review Bioresour. Technol., 98, 2301-2312.

Suzuku, T., Yamada, T., Okazaki, N., Tada, A., Nakanishi, M., Futamata, M., Chen, H.T., 2001. Electromagnetic shielding capacity of wood char loaded with nikel. Mater. Sci. Res. Int., 7, 206-212.

Wen, J.L., Xue, B.L., Xu, F., Sun, R.C., Pinkert, A., 2013. Unmasking the structural features and property of lignin from bamboo. Ind. Crop. Prod., 42, 332-343.

Xiao, G., Liu, J.C., Jin, B.S., 2010. Characteristics of rice straw and hull charcoal by high-temperature carbonization. J. Comb. Sci. Technol., 29, 1220-1225.

Bianco, et al., All in the graphene family—A recommended nomenclature for two-dimensional carbon materials; Carbon 35; 2013; pp. 1-6.

* cited by examiner

METHODS FOR SYNTHESIZING GRAPHENE FROM A LIGNIN SOURCE

RELATED APPLICATION

This application claims priority from U.S. Provisional Patent Application No. 61/831,297, filed Jun. 5, 2013, the entire disclosure of which is incorporated herein by this reference.

STATEMENT OF GOVERNMENT SUPPORT

The invention described herein was made with government support under grant Nos. 114V-11111124-097 and 124V-11111124-091 awarded by the USDA Forest Service. The government has certain rights in the invention.

TECHNICAL FIELD

The presently-disclosed subject matter relates to methods for synthesizing carbon nanomaterials from wood by-products. In particular, the presently-disclosed subject matter relates to the use of lignin from pulping operations for synthesizing carbon-based nanomaterials, such as graphene nanosheets.

BACKGROUND

Lignin is a renewable carbon source and the second most abundant biopolymer next to cellulose on earth. It is a crosslinked and complex natural polymer composed of a phenyl propane unit as a basic unit, and lignin includes about 65 percent carbon, 6 percent hydrogen, and 29 percent oxygen. A great amount of lignin can be obtained from the pulping industry in the name of kraft lignin (or thiolignin) and lignosulfonate (LS). The approximate amount of lignin production in the existing pulping industry worldwide is estimated at more than 50 million tons/year. However, the complex structure of lignin makes the production of value-added chemicals from lignin difficult. Therefore, most lignin is currently not isolated, but is instead burned onsite to recover pulping chemicals and provide steam for power production in kraft pulp mills.

In this respect, LS from the sulfite pulping process is a largely available source of lignin, and the global production of LS is currently around 1 million tons/year. LS has been used for concrete admixtures, dispersants and dust suppression for roads, pellet binders, and vanillin. Others have also attempted to convert lignin into value-added materials, but there are few reports on the successful commercialization of lignin-related products. In particular, there are currently no systematic approaches in the processing of lignin for conversion into carbon-based nanomaterials, including the conversion of lignin to graphene. Additionally, carbon nanomaterials, such as graphene, have stimulated considerable scientific, industrial, and commercial interest due to their intriguing physical properties and enormous potential for various applications. Therefore, it would be beneficial if lignin could be utilized as an alternative carbon source for the production of high value carbon-based nanomaterials and the like.

Accordingly, there remains a need for systems and methods that can convert lignins and/or sources thereof to carbon nanomaterials, such as graphene. It would be advantageous if systems and methods could be achieved to convert lignins to carbon nanomaterials using simple and cost effective solutions.

SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature (s) mentioned; likewise, those features can be applied to other embodiments of the presently-disclosed subject matter, whether listed in this summary or not. To avoid excessive repetition, this summary does not list or suggest all possible combinations of features.

The presently-disclosed subject matter provides, in some embodiments a method of synthesizing carbon nanomaterials, the method comprising mixing a lignin and/or source thereof and a catalyst to form a mixture heating the mixture at a temperature of at least 600° C. for at least 30 minutes, and cooling the heated mixture to form a cooled mixture including graphene. In some instances the lignin and/or source thereof can be selected from a kraft lignin, a thiolignin, a lignosulfonate, a sulfur-free lignin, and combinations thereof, including sodium lignosulfonate.

Additionally, in some embodiments the catalyst can selected from a platinum-containing catalyst, a nickel-containing catalyst, an iron-containing catalyst, and combinations thereof. The catalyst can also be comprised of nanoparticles. For example, the catalyst can include iron nanoparticles, iron nitrate, or a combination thereof. In certain embodiment s the lignin and/or source thereof and catalyst are in a weight ratio of from about 1:1 to about 8:1, such as a weight ratio of about 4:1. In certain embodiments the heating is conducted at a temperature of from about 600° C. to about 1500° C., such as at a temperature of about 1000° C.

In some embodiments the heating is conducted under an inert atmosphere. In some embodiments the heating is conducted for a period of from about 30 minutes to about 120 minutes. In some embodiments the cooling is conducted under an inert atmosphere. In some embodiments, in the cooling step, the mixture is cooled to a temperature of less than about 100° C.

Embodiments of the presently-disclosed methods can further comprise, after the cooling step, a step of purifying the mixture to increase a concentration of carbon nanomaterials in the cooled mixture. For example, the purifying step can include purifying the mixture with water, an acid, or a combination thereof.

Other embodiments of the presently-disclosed subject matter provide a method of synthesizing carbon nanomaterials, the method comprising mixing sodium lignosulfonate and iron nanoparticles to form a mixture heating the mixture at a temperature of about 80° C. to about 1200° C. for about 40 minutes to about 80 minutes under an inert atmosphere and cooling the heated mixture to a temperature of less than about 100° C. under an inert atmosphere to form a cooled mixture including graphene. In some instances the iron nanoparticles have a diameter of less than about 100 nanometers.

Other embodiments of the presently-disclosed subject matter provide a method of synthesizing carbon nanomaterials, the method comprising mixing kraft lignin and an iron-containing catalyst to form a mixture, heating the mixture at a temperature of about 80° C. to about 1200° C. for about 40 minutes to about 80 minutes under an inert atmosphere, and cooling the heated mixture to room temperature under an inert atmosphere to form a cooled mixture including graphene.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

FIG. 4A depicts a SEM image exhibiting clusters of graphene nanosheets in the form of nanoflowers, FIGS. 4B and 2D depict typical HRTEM images presenting folded and wrinkled graphene nanosheets, and FIG. 4C depicts an enlarged view of the center of FIG. 4B. The inset in FIG. 4D depicts an electron diffraction pattern of graphene.

Figure 1:
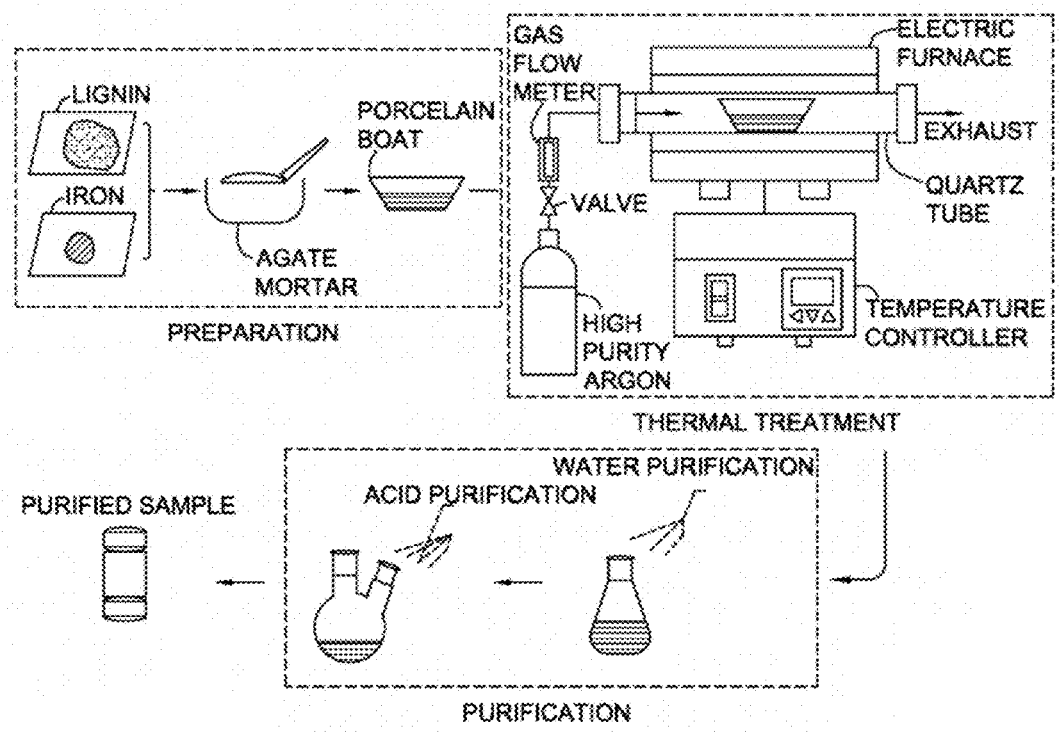
FIG. 1 includes a schematic showing a process for converting lignin to graphene nanosheets in accordance with an embodiment of the presently-disclosed subject matter.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DEFINITIONS

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials are described below.

Following long-standing patent law convention, the terms "a", "an", and "the" refer to "one or more" when used in this application, including the claims. Thus, for example, reference to "a lignin source" includes a plurality of lignin sources, and so forth.

The terms "comprising", "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Unless otherwise stated, as used herein, "lignin" refers to lignin and sources thereof. Therefore, the term "lignin" includes, but is not limited to, kraft lignin (or thiolignin) and lignosulfonate (LS) from the pulping process, sulfur-free lignins from biomass conversion technologies, organosolv pulping, and soda pulping processes, and other lignin productions and derivatives from unusual plant sources or experimental pulping processes as known in the art. Additionally, regardless of whether it is expressly stated, "lignin" as used herein can include lignin as well as one or more sources of lignin.

All combinations of method or process steps as used herein can be performed in any order, unless otherwise specified or clearly implied to the contrary by the context in which the referenced combination is made.

DETAILED DESCRIPTION

In accordance with the present disclosure, methods have been surprisingly discovered that utilize lignin and/or source thereof from pulping operations for synthesizing carbon nanomaterials. Exemplary carbon nanomaterials can be selected from graphite, graphene, including graphene nanosheets, carbon nanotubes, diamond-like carbon, combinations thereof, and the like. In some embodiments the synthesis methods thermally treat lignin and/or a source thereof (e.g., lignosulfonate (LS)) to produce graphene. Thus, embodiments of the present methods provide simple, cost effective thermal processes that use a low-cost raw material to reduce production costs of carbon nanomaterials, which are high value materials with many potential new applications. For instance, carbon nanomaterials such as graphene can be used in nanoelectronic devices, energy storage devices, chemical probes, biosensors, biomedical and biological sensing materials, composites, and the like.

Embodiments of the presently-disclosed methods provide a simple, cost effective process for producing a high value-added carbon-based nanomaterial having many potential applications from a low cost, abundant starting material.

Methods of Synthesizing Graphene

The methods of the present disclosure generally include thermally treating lignin and/or a source thereof in the presence of a catalyst for synthesizing carbon nanomaterials, such as graphene nanosheets. Graphene is a material composed of pure carbon, with atoms arranged in a regular hexagonal pattern. Graphene can be relatively light, and a 1-square-meter sheet can weigh about 0.77 milligrams. Graphene nanosheets, as synthesized with the methods of the presently-described subject matter, have potential beneficial use in many applications, including for example, nanoelectronic devices, energy storage, chemical probes, biosensors, biomedical and biological sensing materials, composites, and the like.

The methods generally include mixing a lignin and/or source thereof with a catalyst to from a mixture. The lignin can be any lignin and/or source thereof known in the art, including, for example, kraft lignin, thiolignin, lignosulfonate, sulfur-free lignin, and salts and/or combinations thereof. In some embodiment, the lignin includes sodium lignosulfonate (LS).

The catalyst is any catalyst known in the art. Suitable catalysts include, but are not limited to, platinum-containing catalysts, nickel-containing catalysts, iron-containing catalysts, and combinations thereof. In some embodiments, the catalyst is in the form of nanoparticles, nanoparticles being measurable on a nanoscale (e.g., 1 nm to 1,000 nm). IN some embodiments the present nanoparticles have a diameter of less than 100 nm, including less than 90 nm, including less than 80 nm, including less than 70 nm, including less than 50 nm, including less than 25 nm, and including from about 1 nm to 100 nm. For instance, the iron-containing catalyst can be selected from iron particles having a diameter of less than 100 nm and/or iron nitrate.

In some embodiments, the lignin and catalyst can be present in the mixture in weight ratios of lignin to catalyst ranging from about 1:1 to about 1:30, including from about 1:1 to about 1:20, including from about 1:1 to about 1:10, including from about 1:1 to about 8:1, including from about 2:1 to about 6:1, and including about 4:1.

Once formed, the lignin and catalyst mixture can be thermally treated by heating the mixture at a temperature and for a period of time sufficient to partially or wholly convert the lignin to a carbon nanomaterial, such as a graphene material. In some embodiments the heating of the thermal treatment is conducted at temperatures of at least 600° C., including temperatures ranging from about 600° C. to about 1500° C., including from about 800° C. to about 1100° C., and including a temperature of about 1000° C. In some embodiments the thermal treatment is conducted for a period of time of at least 30 minutes, including for a period of from about 30 minutes to about 120 minutes, and including about 60 minutes. In certain embodiments the lignin is partially or wholly converted into graphene nanosheets during the heating process (i.e., thermal treatment).

In some embodiments, the thermal treatment is conducted under an inert atmosphere. Exemplary inert atmospheres include atmospheres can include gases selected from nitrogen, argon, helium, carbon dioxide, and combinations thereof. Exemplary inert atmospheres can include atmospheres that do not comprise oxygen. In some instances an inert atmosphere is provided by supplying an inert gas during one or more steps of the presently-described methods. In some instances the inert gas is fed at a constant or changing flow rate during one or more steps of the presently-disclosed methods in order to provide an inert atmosphere.

The methods of the presently-described subject matter can further include, after the heating process, cooling the heated mixture to form a cooled mixture including graphene. In some embodiments the heated mixture is cooled to a temperature of less than about 100° C., less than about 75° C., less than about 50° C., or less than about 25° C., and in some embodiments is cooled to room temperature. In some embodiments, the cooling is conducted under an inert atmosphere. In some instances, a cooling process following the heating process can assist in maintaining the structural integrity of the newly formed carbon nanostructures. In some embodiments the cooling step is a passive step; that is, after the heating step is terminated the heated mixture is allowed to cool naturally.

In some embodiments, following the heating process, the methods can further include purifying the mixture to remove inorganic ash from the lignin. In some embodiments this purifying step can occur following the cooling process. The purification of the cooled mixture can be achieved by water purification, acid purification, combinations thereof, and the like. This includes water and/or acid purification methods that are currently known in the art. In some embodiments the purification process includes exposing synthesized carbon nanomaterials to water and/or acid, and optionally boiling the carbon nanomaterials in water and/or acid. In some embodiments carbon nanomaterials can further be filtered and/or rinsed one or more times to purify the synthesized carbon nanomaterials. The purification processes described herein can recover cooking chemicals left in the lignin during the pulping process, and these recovered cooking chemicals can be potentially be reused in the pulping production. Removal of the cooking chemical also provides a mixture that contains a higher concentration of the synthesized carbon nanomaterials.

Looking now to FIG. 1, a schematic of an exemplary method for synthesizing graphene in accordance with the presently-disclosed subject matter is shown. FIG. 1 shows a first mixing step, wherein lignin and/or a source thereof are mixed with a catalyst to form a mixture. In this embodiment the catalyst is iron and/or an iron-containing catalyst. The lignin and catalyst can be mixed with an agate mortar, and the mixture can be placed in a porcelain boat.

Next, FIG. 1 shows that the mixture in the porcelain boat can be placed into a quartz tube that is connected to an electric furnace. The electric furnace can heat the mixture a predetermined temperature for a predetermined amount of time. In some embodiments the mixture is heated to a temperature of at least 600° C. for at least 30 minutes. Furthermore, an inert atmosphere can be provided within the quartz tube by supplying argon across the mixture during the thermal treatment (i.e., heating step). FIG. 1 further shows a water purification and an acid purification step that can be performed after the heating step, thereby yielding a purified sample that comprises carbon nanomaterials.

EXAMPLES

The presently-disclosed subject matter is further illustrated by the following specific but non-limiting examples. The following examples may include compilations of data that are representative of data gathered at various times during the course of development and experimentation related to the presently-disclosed subject matter.

Example 1

Materials

Lignosulfonate (LS) (Na salt), from Sigma-Aldrich Inc. (St. Louis, Mo.), was used as a lignin source, and therefore also served as carbon source. Iron nanoparticles (FeNPs) (25 nm in average particle size), from Sun Innovations Inc. (Fremont, Calif.), were used as the catalyst for the thermal treatment.

Thermal Process

Thermal treatment of LS was carried out in a split-hinge 2 in.-quartz tube electric furnace (Lindberg/Blue M1200) equipped with a temperature controller (Lindberg/Blue UTC150). The quartz tube had an outer diameter of 2 inches and a length of 32 inches. For each experimental run, 250 mg of FeNPs (1 part by weight) and 1000 mg of LS (4 parts by weight) were mixed and then ground in an agate mortar. The well-ground sample mixture was loaded into a porcelain boat which was placed in the middle of the quartz tube. The sample was heated to 1000° C. at a ramping rate of 20° C./min under argon with a flow rate of 1 L/min. The temperature was held at 1000° C. for 1 hour. After one hour the furnace was turned off and the sample cooled to ambient temperature under an inert argon atmosphere.

Purification

LS samples after thermal treatment contained the inorganic ash that originated from the pulping chemicals. Without being bound by theory or mechanism, the ash may disrupt instrumental characterization of the samples and make data analyses difficult. To remove the water soluble inorganic ash from the thermally-treated LS sample, 500 mg of the thermally treated LS sample and 20 mL of de-ionized water (DI-water) were added to a flask, and the mixture was boiled for 30 min. The boiled sample was filtered through a nylon membrane (0.45 μm) and then rinsed with 100 mL of DI-water. The washed sample was dried in an oven at 105° C. overnight.

Analysis

Raman spectra were recorded at three locations of each sample using a Jobin Yvon Lab Ram HR spectrometer (Horiba, Kyoto, Japan) with a 514.56 nm Ar laser. Powder X-ray diffraction (XRD) was performed with a Rigaku SmartLab X-ray diffractometer (Rigaku, Tokyo, Japan) using Cu Kα radiation (λ=1.5418 Å). Field emission scanning electron microscopy (FE-SEM) images were obtained by a JSM-6500F (JEOL). For high-resolution transmission electron microscopy (HRTEM), the samples were further ground in ethanol by an agate mortar to reduce their size and then a drop of this suspension was dripped onto a 300 mesh copper grid with a holey support film. HRTEM analysis was performed on a JEM 2100F (JEOL, Tokyo, Japan) equipped with an EDAX (Ametek, Berwyn, Pa.).

Results

Table 1 shows the result of carbonization yields of LS thermally-treated with Fe (Fe-HTLS) as the catalyst and LS thermally-treated without Fe catalyst (HTLS). The carbonization yields of Fe-HTLS and HTLS were 50.1% and 45.3%, respectively. In the case of Fe-HTLS, as FeNPs were added to LS as the catalyst, the weight of FeNPs needed to be deducted from the total weight of the LS and FeNPs mixture to calculate the true carbonization yield of LS. The carbonization yield of LS thermally-treated with Fe after the weight correction of FeNPs was 30.2%. On the other hand, an ash content of 19.5% was assumed in the thermally treated LS. This content was determined using the TAPPI Standard T 211-om 93. Therefore, the carbonization yields of Fe-HTLS and HTLS after ash weight correction were 24.3% and 36.5%, respectively. Without being bound by theory or mechanism, the lower carbonization yield of Fe-HTLS may be due to the excessive decomposition of LS by the catalytic action of FeNPs.

TABLE 1

Carbonization yields after thermal treatment of LS with and without Fe nanoparticles, and the yields after the correction of Fe nanoparticles and ash in Fe-HTLS and HTLS.

| | Carbonization yield (%) | | |
|---|---|---|---|
| Sample | After thermal treatment | After correcting for FeNPs | After correcting for ash |
| Fe-HTLS | 50.1 | 30.2 | 24.3 |
| HTLS | 45.3 | — | 36.5 |

Figure 2:
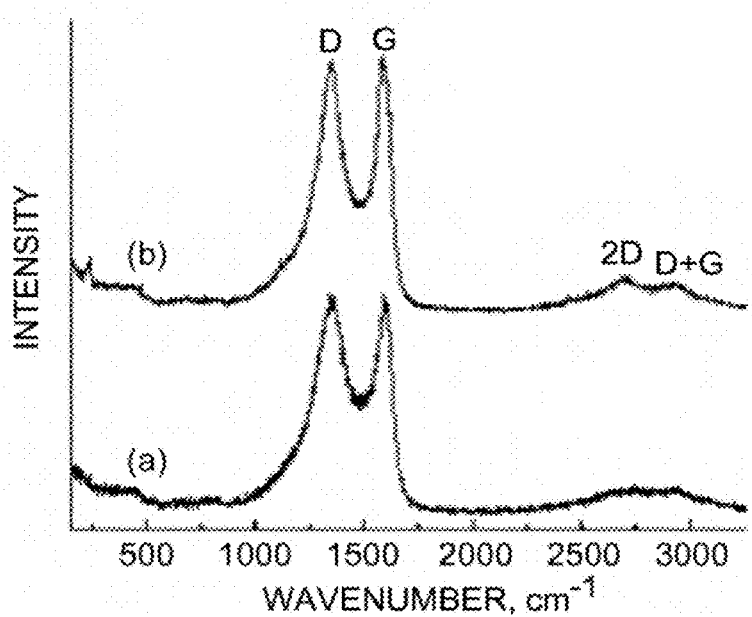
FIG. 2 includes a plot showing Raman spectra of lignosulfonate (LS) thermally treated (a) without the use of Fe nanoparticles as a catalyst; and (b) with Fe nanoparticles as a catalyst.

Raman spectroscopy is also an effective technique to characterize carbon structures of carbonaceous materials such as graphite, graphene, carbon nanotubes, and diamond-like carbon. Therefore, any significant changes in the chemical structure of LS which occurred during the thermal treatment were characterized by Raman spectroscopy. FIG. 2 shows Raman spectra of (a) HTLS and (b) Fe-HTLS. The Raman spectra in both samples show two distinct peaks, G and D peaks, that appear around 1580 and 1350 cm$^{-1}$, respectively. In general, the D peak indicates the vibration of sp$^2$-hybridized carbon bonded with structural imperfections, while the G peak indicates the in-plane vibration of $sp^2$-bonded crystalline carbon. Thus, the G peak in FIG. 2 indicates that graphite- or graphene-like carbon structures may be formed in both samples, while the D peak indicates a decrease of the size of the in-plane $sp^2$ domains as well as an increase of edge planes and the degree of disorder in both samples. In the Raman spectrum of Fe-HTLS, the width of the D peak is narrower than that of HTLS, which indicates that Fe-HTLS samples contained fewer structural imperfections than the HTLS samples. In addition, the peak intensity ratio of the D" peak (1500-1550 $cm^{-1}$, associated with an amorphous $sp^2$-bonded carbon) to the G peak, $I^{D''/G''}$, as a carbonization indicator, decreased from 0.49 to 0.38 with Fe. The lower peak intensity ratio indicates that Fe catalyst reduced the structural imperfections and amorphous phase for $sp^2$-bonded carbon. On the other hand, Fe-HTLS had a 2D peak other than D and G peaks on the spectrum. The 2D peak (also called the G' peak) is the second order of the D peak. The width of the 2D peak ranged from 2650 to 2750 $cm^{-1}$, which corresponded to the turbostratic graphite with its graphene layers stacked in a randomly rotated fashion with respect to one another along the C-axis. Thus, graphene sheets may have occurred in Fe-HTLS samples, but they largely existed in the form of overlapped graphenes with a turbostratic structure.

Figure 3:
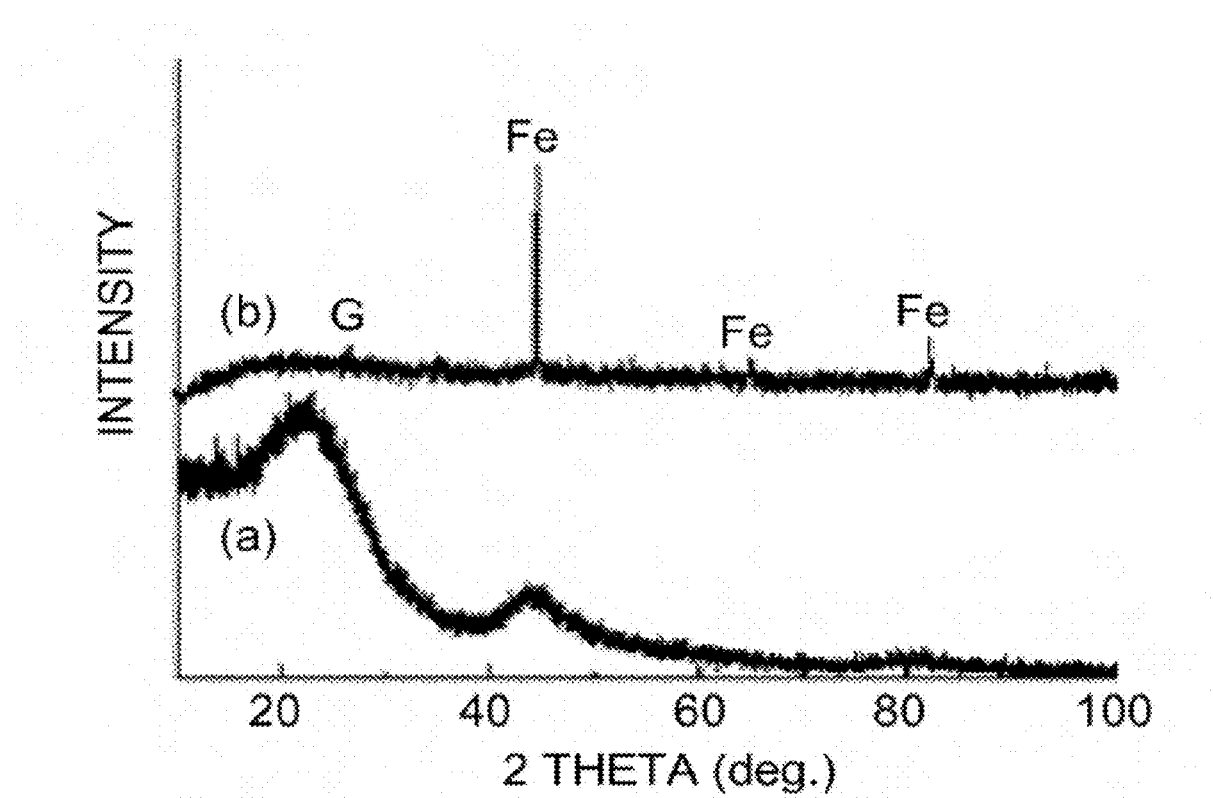
FIG. 3 includes a plot showing powder X-ray diffraction (XRD) patterns of LS thermally treated (a) without Fe nanoparticles as a catalyst; and (b) with Fe nanoparticles as a catalyst. G: graphite; Fe: iron.

To further analyze the structural difference between FeHTLS and HTLS samples, their XRD patterns were measured (FIG. 3). In general, the XRD pattern of graphite powder (including artificial graphite and meso carbon microbeads) exhibited a sharp and characteristic peak (002) of graphite at 26-27°. HTLS had two dispersive and broad diffraction peaks at 26° and 43° on its XRD spectrum, as shown in FIG. 3(a). These two peaks correspond to (002) and (100) planes of graphite. The high intensity in the range of 10-25° indicates that HTLS contained a significant amount of amorphous carbon in agreement with Raman spectroscopy. As shown in FIG. 3(b), the two peaks corresponding to graphite did not appear on the XRD spectrum of Fe-HTLS, and only the typical iron lattices appeared. Without being bound by theory or mechanism, it is possible that the structural change from graphite to graphene sheets causes a weakened (002) peak of graphene sheets. This phenomenon may also occur due to the strong intensity of the iron peaks on the XRD spectrum. Based on the results of Raman spectroscopy and XRD, it was expected that graphene nanosheets may be formed in Fe-HTLS samples. To verify this, the morphology and nanostructure of Fe-HTLS were characterized by SEM and HRTEM observations.

Figure 4A:
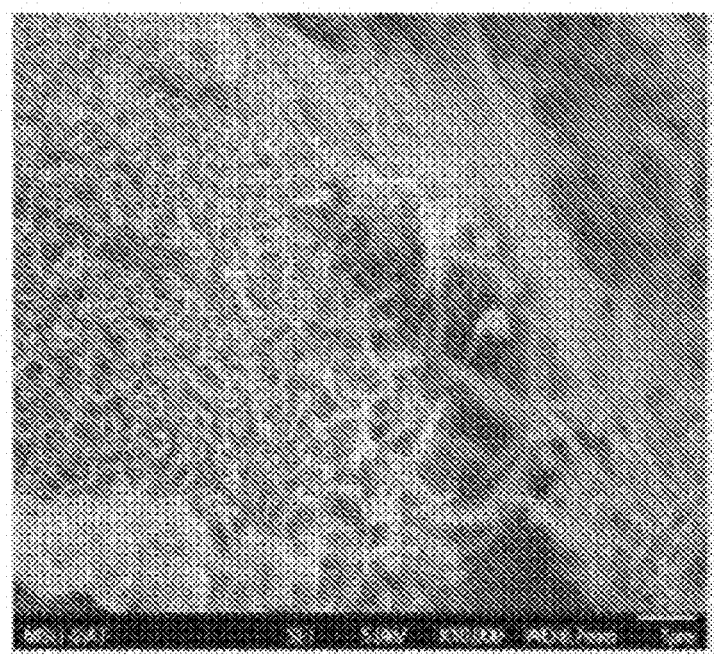
FIGS. 4A to 4D includes scanning electron microscopy (SEM) and HRTEM images showing graphene nanosheets prepared from LS thermally treated with iron (Fe) nanoparticles as a catalyst (Fe-HTLS), where
Figure 4B:
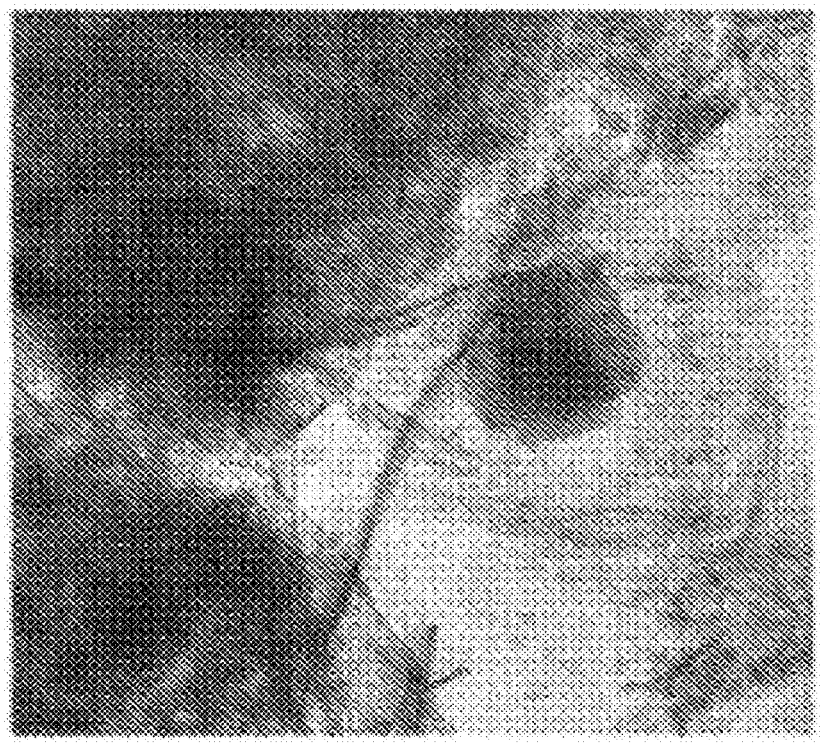
Figure 4C:
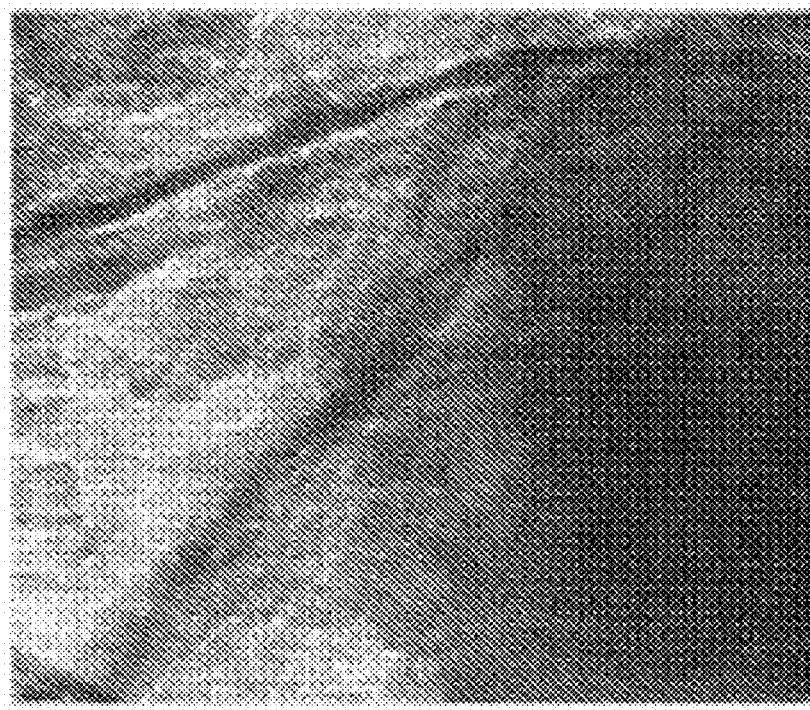
Figure 4D:
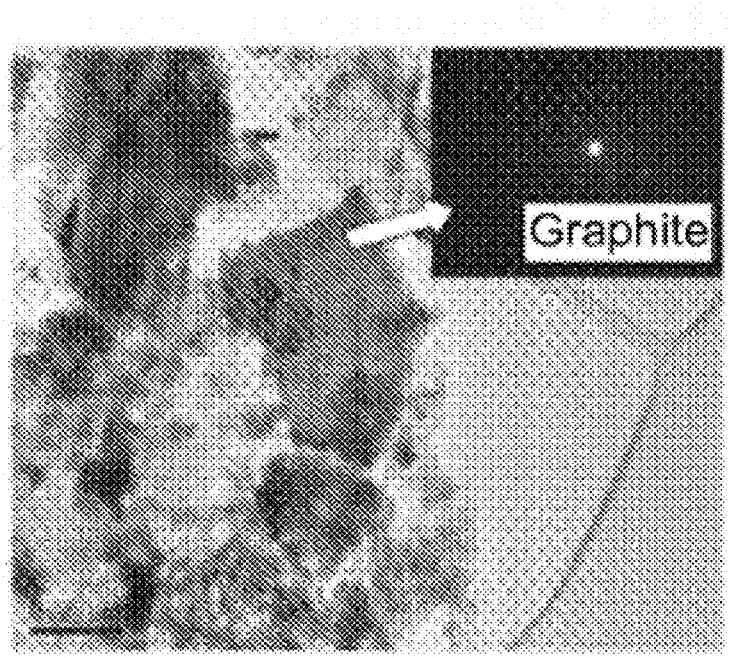

FIG. 4A shows the SEM image of Fe-HTLS sample surface. The surface was covered with "flower-like" graphene sheet agglomerate. FIG. 4B is a HRTEM image of the Fe-HTLS sample showing that graphene sheets were wrinkled and folded like crumpled paper. FIG. 4C, a higher magnification image of the center part of FIG. 4B, shows a well-ordered graphene surface. The inset of FIG. 3D exhibits a typical six-fold symmetry electron pattern for graphite. In previous methods it has been reported that that wood char thermally treated at the same temperature as the present method in the presence of Fe catalyst primarily forms carbon nanomaterials that include carbon-encapsulated Fe nanoparticles with well-aligned multi-graphitic layers and also graphitic carbon structures with long and entangled multilayers. However, in this Example, the present methods produced carbon nanomaterials that primarily included graphene nanosheets.

The graphitization is preceded with the transformation of $sp^3$ hybridized to $sp^2$ carbon atoms. In the case of wood, the major component is carbohydrates such as cellulose and hemicellulose that account for 70-80% of wood, and these carbohydrates are mostly composed of $sp^3$ hybridized carbon atoms. Therefore the conversion of $sp^3$ hybridized carbon atoms to $sp^2$ hybridized carbon atoms occurs in the graphitization process, and the process usually requires a high temperature (e.g., more than 1400° C.). However, lignin substantially has a $sp^2$ bonded aromatic ring structure that makes the conversion of lignin to graphene nanosheets relatively easier than that of wood carbohydrates.

This Example demonstrates an exemplary method for synthesizing graphene nanosheets from technical sodium lignosulfonates. The method includes a thermal treatment in the presence of an Fe catalyst. Accordingly, this Example evidences that lignin can be a valuable carbon source for the synthesis of carbon nanomaterials, such as graphene.

Example 2

This Examples describes processes for pyrolyzing lignin in a high-temperature reactor in an inert atmosphere at different final temperatures that ranged from 500° C. to 1000° C. The chemical composition of char was analyzed by Fourier transform infrared (FTIR) and X-ray diffraction (XRD). The surface morphology was obtained by scanning electron microscopy (SEM).

Materials

The lignin used in this Example was lignosulfonic acid sodium salt (Mw~52,000, Mn~7,000), obtained as a fine light brown powder from Sigma-Aldrich. It had approximately 7.8 wt. % moisture and 6 wt. % ash, consisting mainly as oxides of sodium, potassium, silicon, and aluminum. The lignin contained 63 wt % carbon, 6 wt % hydrogen, 29 wt % oxygen, and 4 wt % sulfur, on a dry, ash-free (daf) basis. Fe nanoparticles (25 nm in average particle size) was purchased from Sun Innovations Inc. and used as the catalyst for the pyrolysis. Nitric acid (70% concentration), analytic reagent, was obtained from Aldrich Chemical Company, Inc.

Thermal Process

Figure 5:
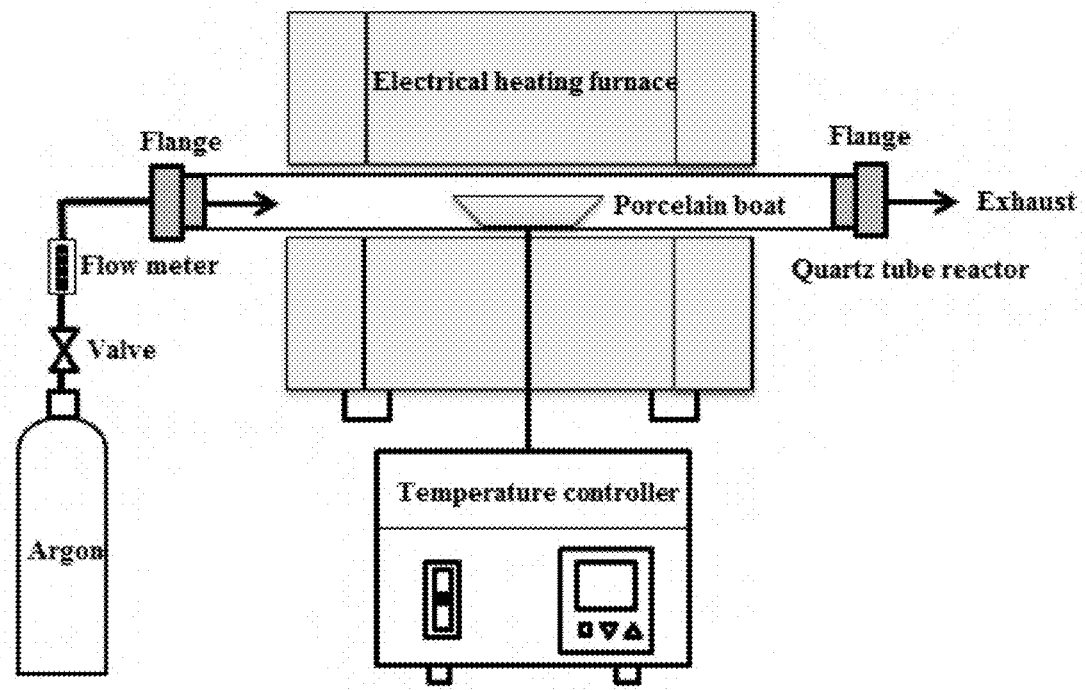
FIG. 5 includes a schematic showing a reactor for a thermal process in accordance with an embodiment of the presently-disclosed subject matter.

Co-pyrolysis of lignin and catalyst was carried out in a split-hinge quartz tube electric furnace (Lindberg Blue M 1200) equipped with a temperature controller (Lindberg/Blue UTC 150) as shown in FIG. 5. The quartz tube had an outer diameter of 2 inches and a length of 32 inches. A porcelain boat containing up to 2 g of lignin and 0.5 g Fe nanoparticles, spread as a thin layer, was placed in the middle of the quartz tube. Then argon valve was turned on with a flow rate of 1.8 L/min for 15 min, to purge all oxygen out of the quartz tube. The reactor was heated at 20° C./min starting from room temperature to the target temperatures of 500° C., 600° C., 700° C., 800° C., 900° C. or 1000° C., and was held at the target temperature for 1 hour. After that, the furnace was turned off and the product char was allowed to cool to ambient temperature under an argon atmosphere. The char yield was calculated from the amount of char based on the initial mass of unpyrolyzed lignin. The experimental error in the yield measurements was less than ±1%.

Purification

To remove the water soluble inorganic ash and Fe nanoparticles from the thermal-treated samples, 2.5 g of the thermal-treated sample and 30 ml of distilled water were added to a flask, and the mixture boiled for 30 min. After cooling, the boiled sample was filtered through a nylon membrane (0.45 μm) and then rinsed with 300 ml distilled water. Subsequently, the rinsed sample and 40 ml 25 wt. % $HNO_3$ solution were added to a flask. The flask equipped with a condenser pipe was put into an oil bath boiling for 2 hours. After cooling, the solution was filtered and rinsed with 400 ml distilled water. Then the steps of distilled water washing were repeated, and the washed sample was dried in oven at 105° C. overnight. The samples IDs were donated as G500, G600, G700, G800, G900 and G1000, respectively.

Analysis

Thermal Gravimetric Analysis (TGA) was performed on a 50H Thermo Gravimetric Analyzer (Shimadzu) from the room temperature to 1000° C. at a heating rate of 20° C./min using purified nitrogen with a flow rate of 50 ml/min. Fourier transform infrared (FTIR) spectra were obtained using a Varian Excalibur 3100 spectrometer with samples in KBr pellets in the range of 500-4000 cm$^{-1}$, and a spectral resolution of 4 cm$^{-1}$ was used. Powder X-ray diffraction (XRD) was performed with a Rigaku Smart-lab X-ray diffractometer (Rigaku) using Cu Kα radiation (λ=1.5418 Å). Raman spectra were recorded at three locations of each sample using LabRAM Arimas Horiba Jobin Yvon Confocal Raman Microscope with a 532 nm green laser. Field emission scanning electron microscopy (FE-SEM) images were obtained by a JSM-6500F (JEOL). High-resolution transmission electron microscopy (HRTEM) analysis was performed on a JEM 2100F (JEOL).

Results

A simple one-stage first-order Coats-Redfern formula (Aboulkas and El Harfi 2008) was employed to describe the main pyrolysis stage for lignin, which is given by $$\ln\left[\frac{-\ln(1-\alpha)}{T^2}\right] = \ln\left(\frac{AR}{\beta E}\right) - \frac{E}{RT},$$

where α is the relative mass loss, β is the heating rate, T is the absolute temperature, A is the pre-exponential factor, R is the gas constant, and E is the activation energy. From the linear plot of $\ln((-\ln(1-\alpha))/T^2)$ versus 1/T, the activation energy E and pre-exponential factor A can be calculated by the slope and intercept (Table 2).

TABLE 2

Average activation energy of different stages.

| Stage No. | Temperature range (° C.) | E (kJ/mol) | A (min$^{-1}$) | Linear correlation coefficient |
|---|---|---|---|---|
| 2 | 274-477 | 26.55 | 1.24 × 10$^5$ | 0.9724 |
| 3 | 650-853 | 49.79 | 2.35 × 10$^6$ | 0.9634 |
| 4 | 916-963 | 109.53 | 1.06 × 10$^8$ | 0.9706 |

Figure 6:
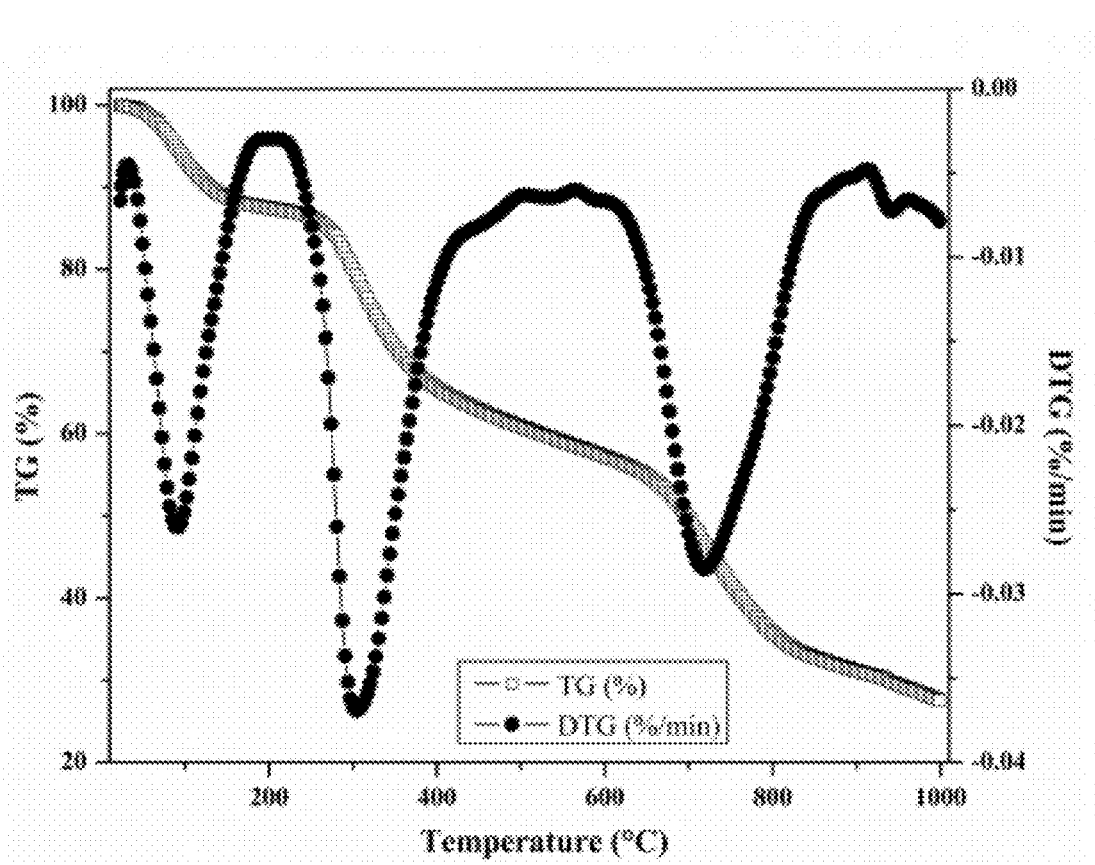
FIG. 6 includes a plot showing thermal gravimetric (TG) and differential thermo-gravimetric (DTG) curves of a mixture of lignin and Fe-nanoparticles under $N_2$.

TG and differential thermo-gravimetric (DTG) curves of the mixture of lignin and Fe-nanoparticles (with the mass ratio of 4:1) are plotted in FIG. 6. For the DTG curve, three weight loss stages were observed below 900° C. and a slight mass loss was noticed at 900-1000° C. For the first stage from room temperature to 200° C., the weight loss was usually caused by moisture evaporation as no chemical reaction occurred. Therefore, this stage is excluded from discussion here.

The secondary stage from 200-500° C. with a peak at ~305° C. gave an activation energy of 26.55 kJ/mol, and the mass loss as about 27%. When the temperature was 500-900° C. with a peak at ~717° C., the activation energy for the third stage was 49.79 kJ/mol and the mass loss was about 40%. The activation energy for the fourth stage with a temperature of 900-1000° C. is 109.53 kJ/mol, which was higher than the former but mass loss was much less, just 5.58%. Without being bound by theory or mechanism, the bonds of low energy may break first and remaining bonds need more active energy to crack. Meanwhile, the presence of catalyst made the values of activation energies lower than that in literature.

Table 3 shows the effect of temperature on char yield. The char yield decreased gradually with increasing temperature. According to the TAPPI standard T 211-om 93, the ash content of lignin is 6.43%, so the char yields after ash correction were obtained. The carbonization of lignin occurred in a wide temperature range.

TABLE 3

Effect of temperature on char yield from lignin under pyrolytic conditions.

| | Temperature (° C.) | 500 | 600 | 700 | 800 | 900 | 1000 |
|---|---|---|---|---|---|---|---|
| Char yield (%) | Sample ID | G500 | G600 | G700 | G800 | G900 | G1000 |
| | After heating treatment | 67.63 | 55.58 | 54.55 | 53.74 | 52.89 | 52.42 |
| | After correcting for Fe nanoparticles | 59.93 | 45.00 | 43.27 | 42.26 | 41.70 | 40.89 |
| | After purification | 36.98 | 26.73 | 24.03 | 22.58 | 22.15 | 21.99 |

Figure 7:
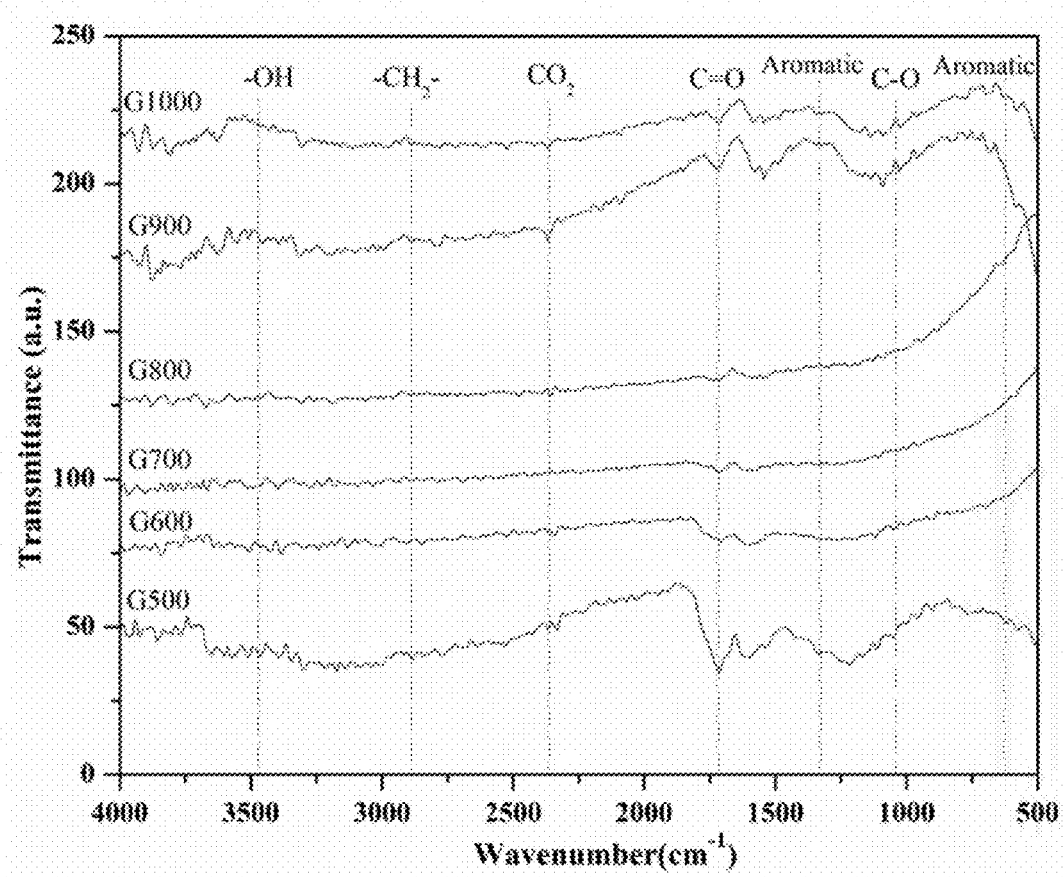
FIG. 7 includes a plot showing Fourier transform infrared (FTIR) spectra of samples.

The chars from pyrolysis were characterized by infrared spectroscopy, as presented in FIG. 7. There were some upward drifts in the baseline at low wave numbers, and the drifts were probably due to more scattering at high wave numbers resulting from the non-transparent samples. Various bands in the spectra were identified as follows: the peak at wavenumber of 3465 cm$^{-1}$ corresponded to —OH stretching vibration motion, and the peak at 2888 cm$^{-1}$ corresponded to ~CH$_2$. The peaks at 1330 and 690 cm$^{-1}$ corresponded to aromatic groups; the region between 1500 and 1800 cm$^{-1}$ corresponded to a CO stretching vibration motion, while the peak at 1042 cm$^{-1}$ corresponded to a C—O stretching vibration motion. The wavenumbers above 3600 cm$^{-1}$, probably corresponding to free —OH stretching vibrations, grew slowly with pyrolysis temperature, which could be due to increased carbonization of the samples.

The peaks at 1300-1700 cm$^{-1}$ in the FTIR spectra changed significantly with the changing of the heat-treatment temperature. The spectra patterns of chars from pyrolysis at 600° C., 700° C., and 800° C. were different from other samples. The symmetric CH$_3$ stretch of O—CH$_3$ group appeared at 2839-2846 cm$^{-1}$ in chars and its intensity decreased as the temperature increased from 500° C. to 600° C. The peak was almost absent above 600° C., indicating that the CH$_3$ groups were removed from the substituted aromatic rings at high temperature.

Figure 8:
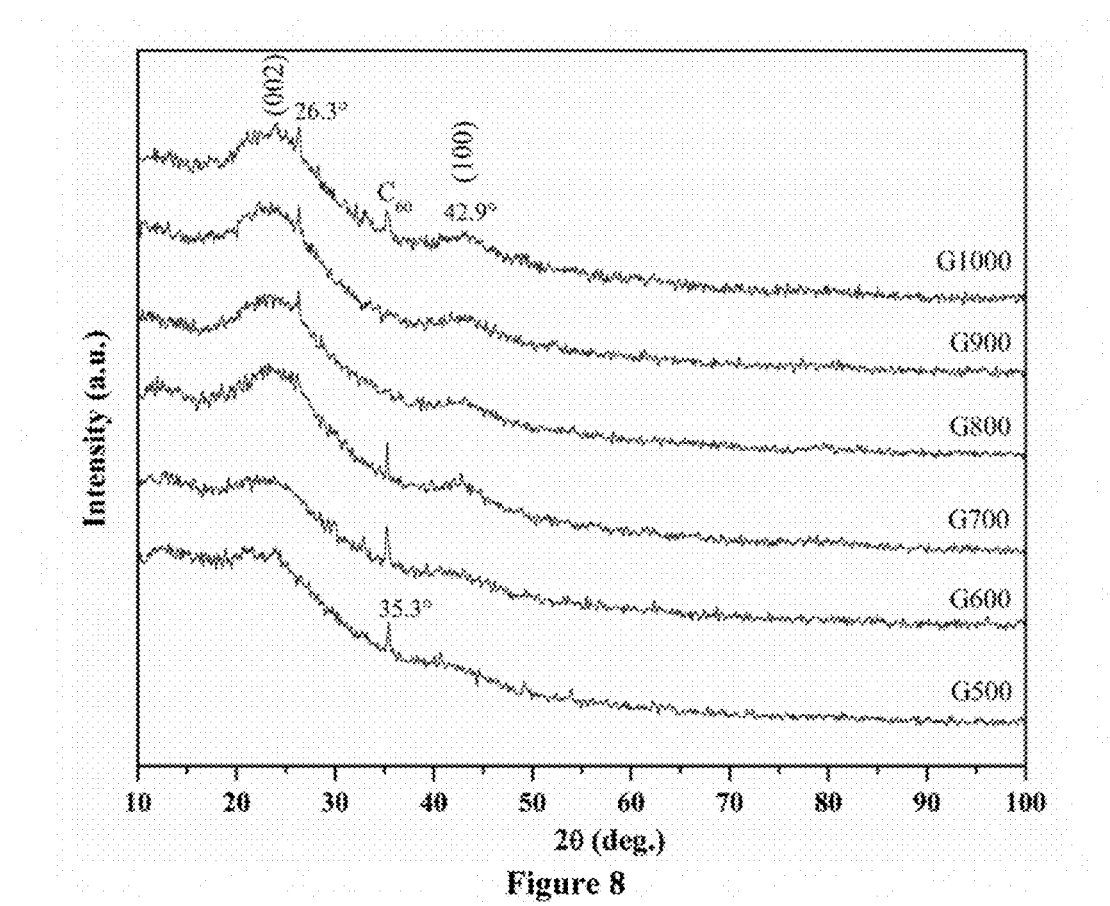
FIG. 8 includes a plot showing XRD patterns of the chars from carbonization.
Figure 9A:
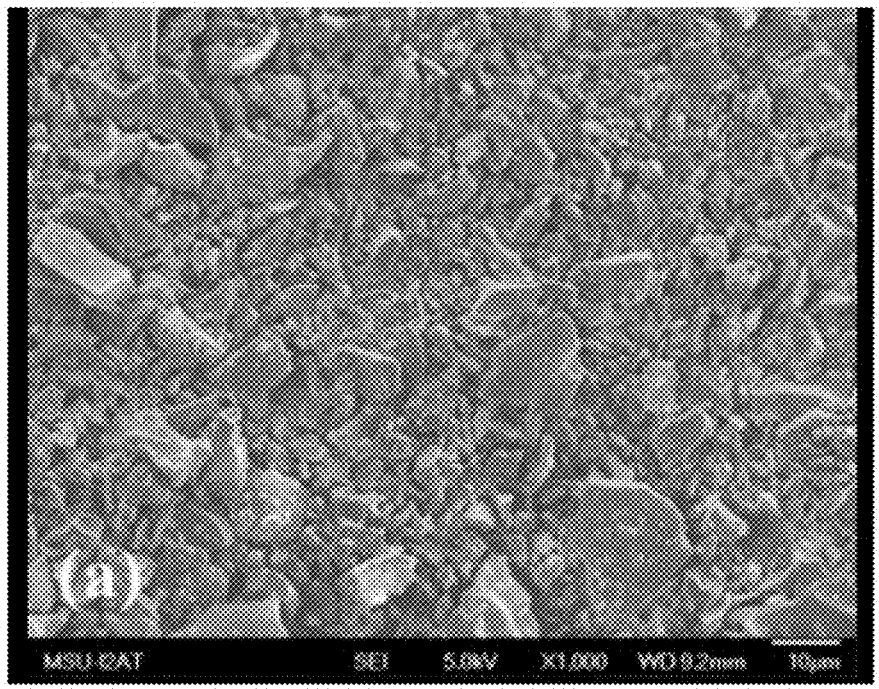
FIGS. 9A to 9F include SEM images of samples synthesized at, respectively, 500° C., 600° C., 700° C., 800° C., 900° C., and 1000° C.
Figure 9B:
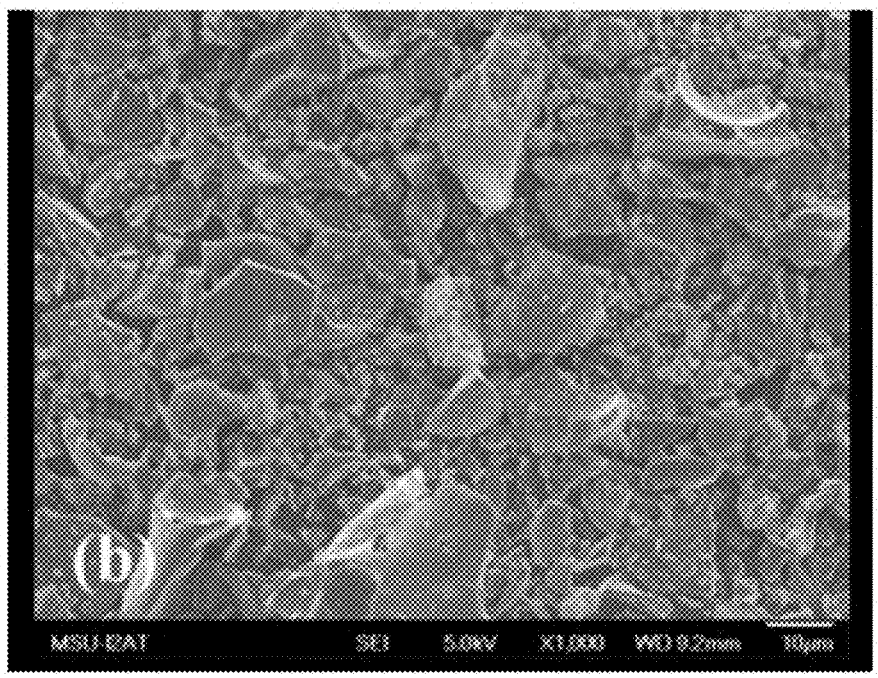
Figure 9C:
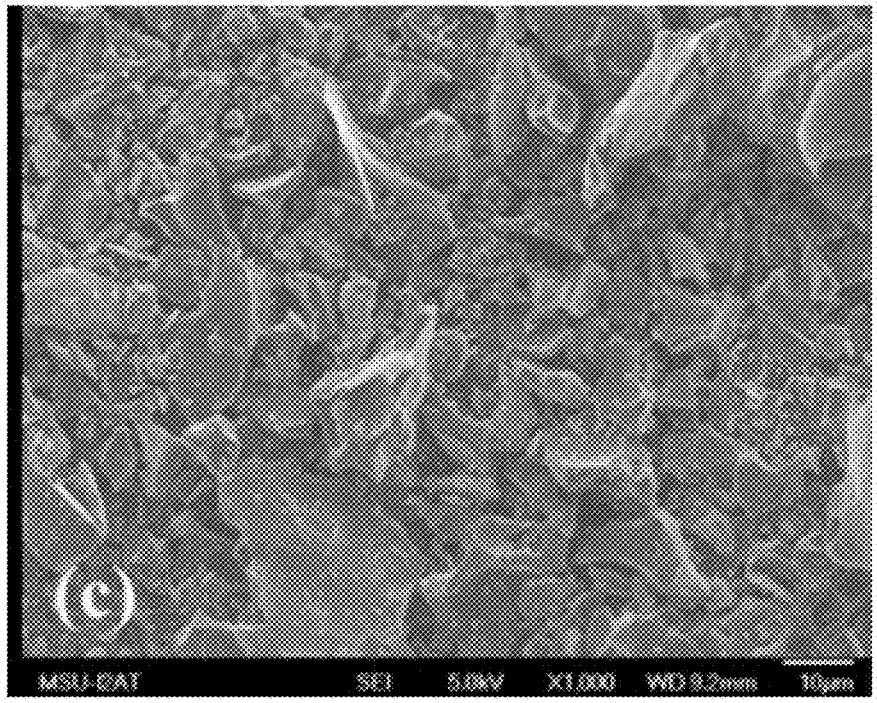
Figure 9D:
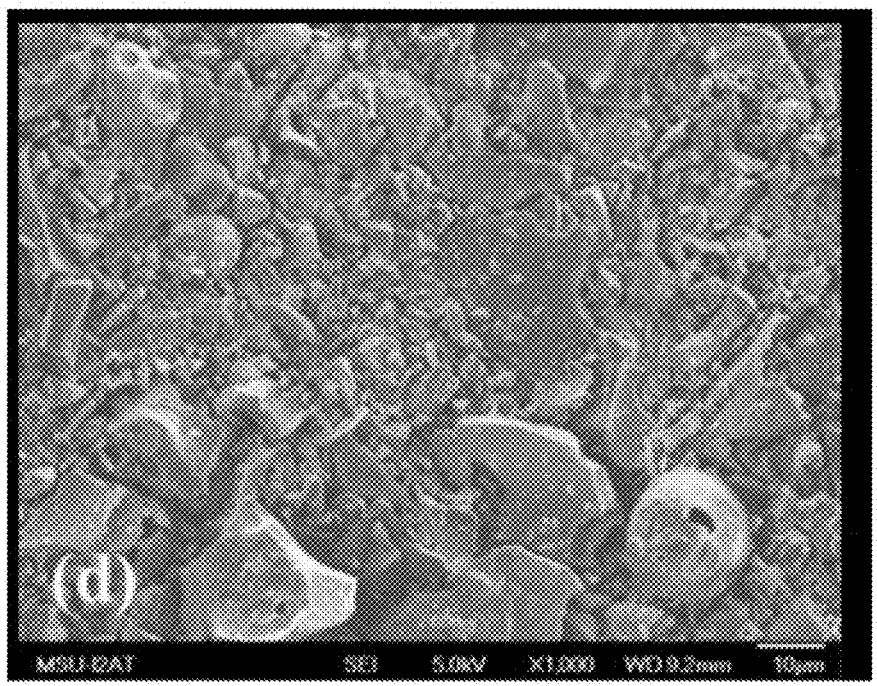
Figure 9E:
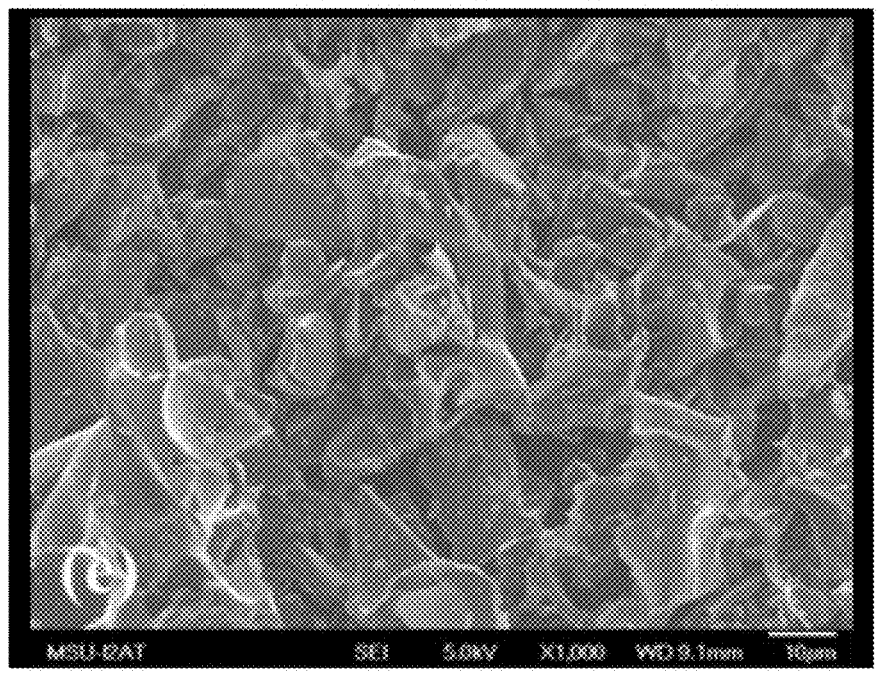
Figure 9F:
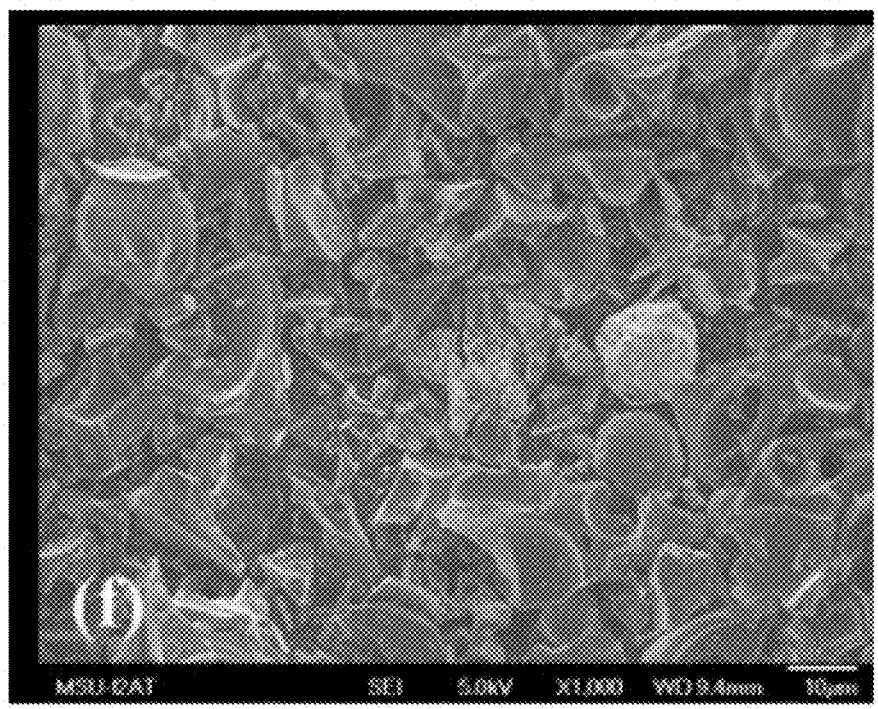
Figure 10A:
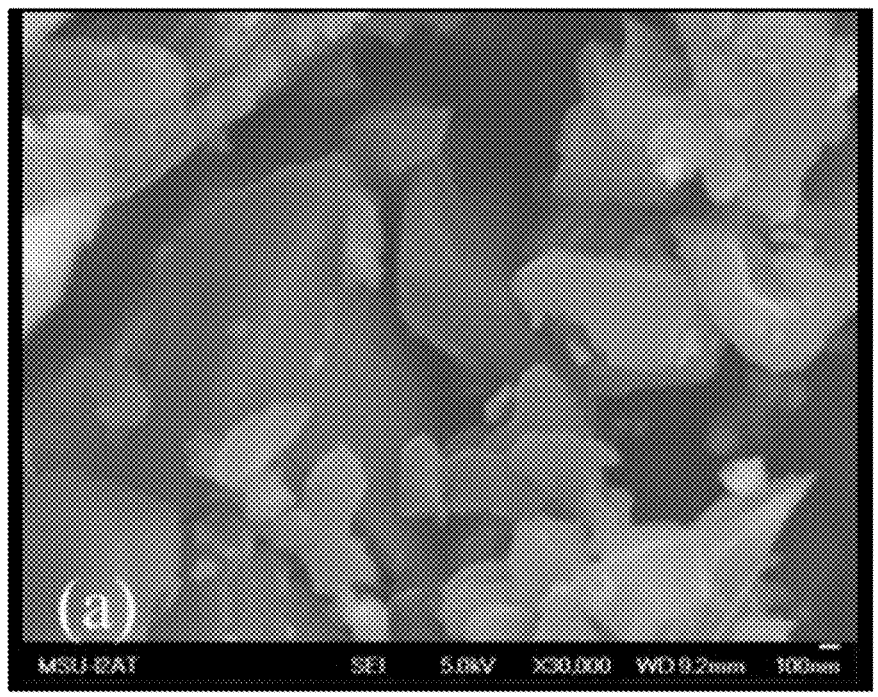
FIGS. 10A to 10F include SEM images of samples synthesized at, respectively, 500° C., 600° C., 700° C., 800° C., 900° C., and 1000° C.
Figure 10B:
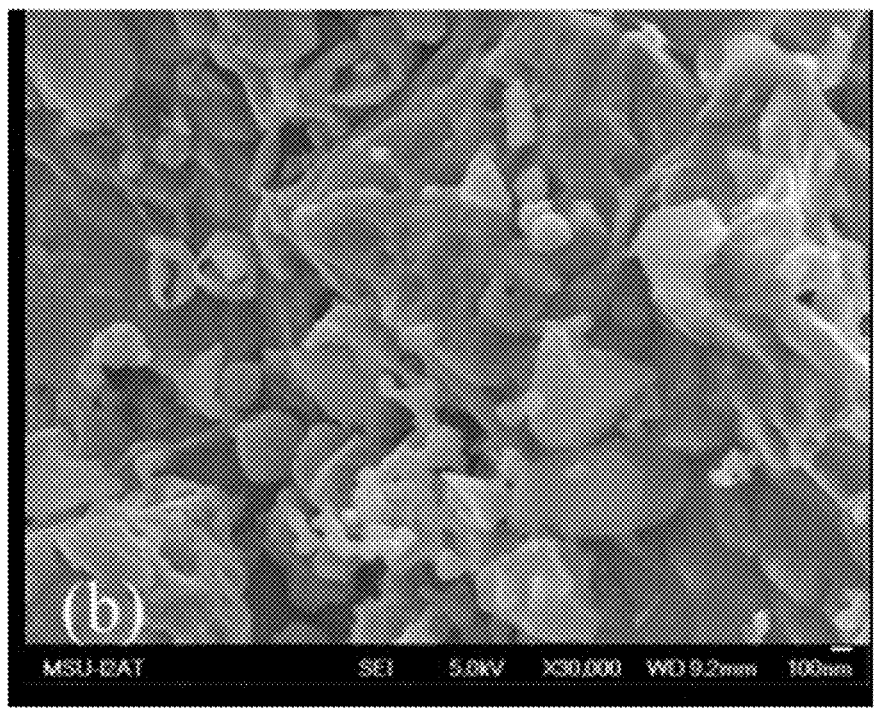
Figure 10C:
Figure 10D:
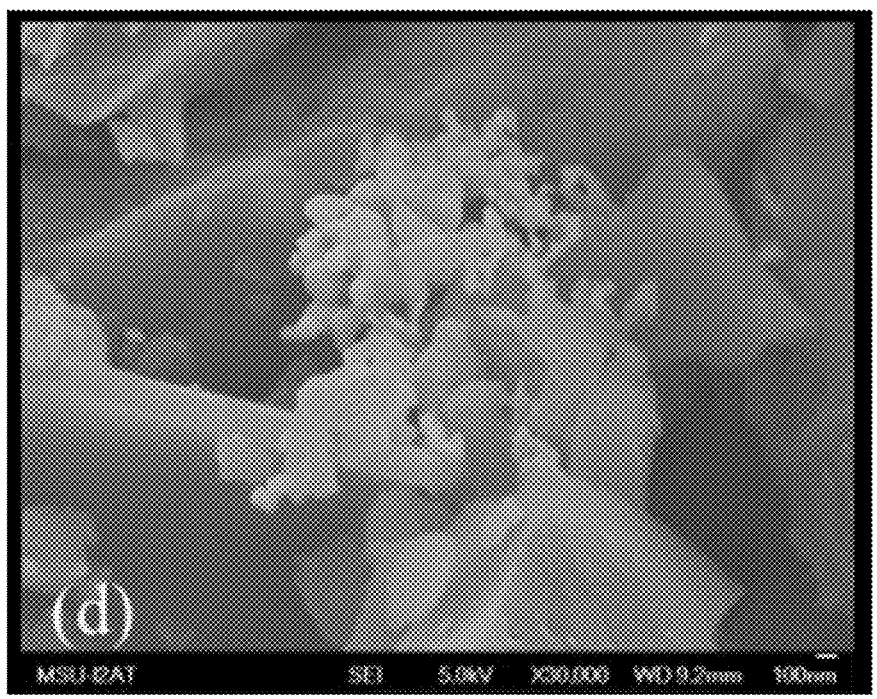
Figure 10E:
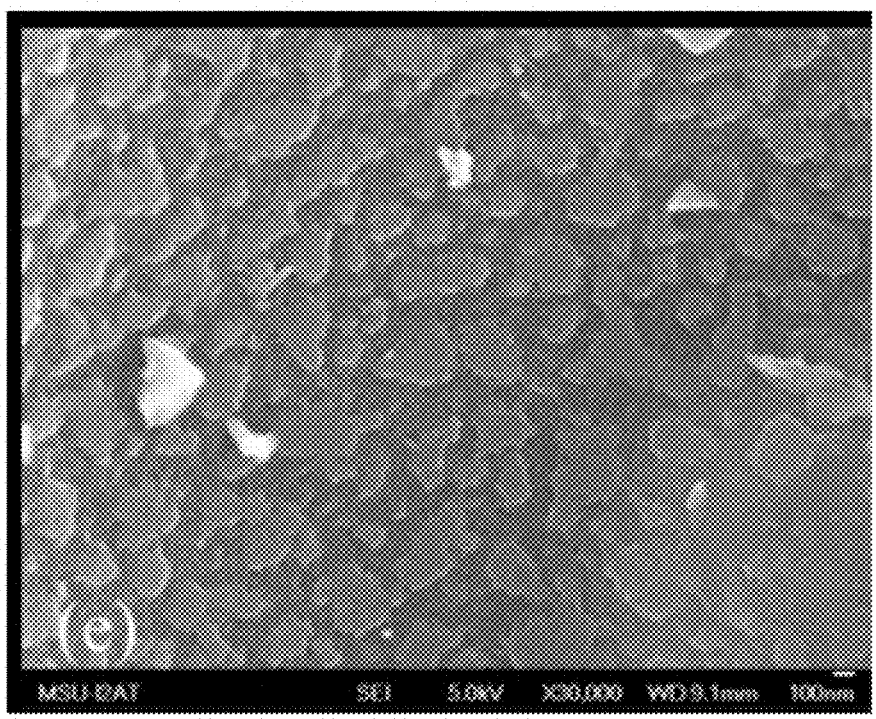
Figure 10F:
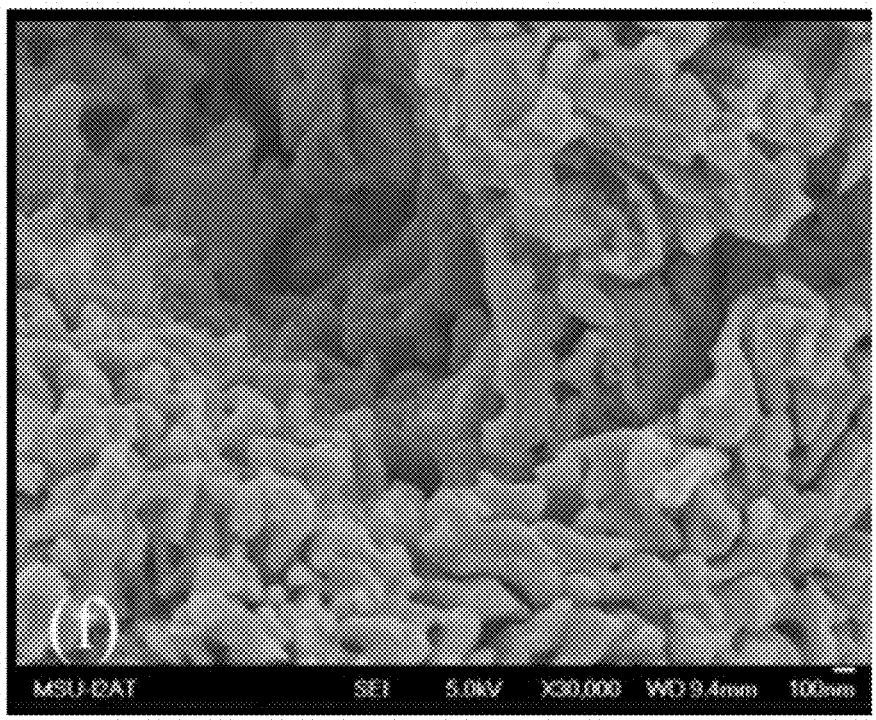

The results of XRD analyses of the chars are shown in FIG. 8. The peaks at around 2θ=26°-27° and 42°-43° were attributed as the (002) plane and (100) plane of the carbon crystals, respectively, which are the characteristic peaks of graphite single crystal (Jones and Thrower 1991). The intensity of peak at 42°-43° increased with increasing the heat-treated temperature, implying the increased graphitization degree of sample. The peak around 35°, assigned as C$_{60}$, began to take shape at temperature of 500° C., 600° C., 700° C., and 1000° C., but not observed at the temperature of 800° C. and 900° C.

The results of SEM analyses of chars are shown in FIGS. 9 and 10. As seen in FIG. 9, the morphologies of chars from pyrolysis at different temperature were analogous, and these polygonal shapes were similar to multiple conchoidal fracture surfaces. The char morphologies exhibited both open and closed vesicles, which were the result of volatile gases released from lignin pyrolysis. These polygonal flakes resulted from vesicles rupture caused by grinding of samples before SEM test. As shown in FIG. 10, some stacked flake structures and particles appeared on the surfaces of chars. According to the results of XRD and Raman, these stacked flake structures appeared to be graphene sheets and particles that are $C_{60}$ or carbon crystal agglomerates.

Example 3

This Example describes exemplary methods for synthesizing graphene nanosheets by thermal conversion of lignin at 1000° C. for 1 hour with iron nitrate as catalyst in the presence of Argon. The graphene were characterized using Raman spectroscopy, X-ray diffraction, transmission electron microscopy, and selected area electron diffraction. To avoid undue repetition, any of the materials or methods that are repeated from the previous Examples are not specifically recited herein.

Methods

Lignin, LS, and iron nitrate Fe $(NO_3)_3 \cdot 9H_2O$ were obtained from Sigma-Aldrich Inc. 18.4 g of Fe $(NO_3)_3 \cdot 9H_2O$ (Equivalent to 2.54 g Fe) was added to 100 mL de-ionized water and stirred to dissolve it. Then, 10.0 g of LS was added to the iron nitrate solution. The obtained mixture was kept at room temperature for 24 h, and then dried in oven at 105° C. overnight, to get iron nitrate promoted LS (INPLS).

Thermal Process

Thermal treatment was carried out in a split-hinge quartz tube electric furnace (Lindberg/Blue M 1200) equipped with a temperature controller (Lindberg/Blue UTC 150). For the experiment run, 2.5 g of IPNLS was well grinded in an agate mortar, and then was transferred into a porcelain boat which was placed in the middle of the quartz tube. The sample was heated to 1000° C. at a ramping rate of 20° C./min under argon with a flow rate of 1.8 L/min. The temperature was held at 1000° C. for 1 h, the temperature controller was turned off and the sample cooled to ambient temperature under argon atmosphere.

Analysis

For HRTEM, the sample was further ground in ethanol by an agate mortar to reduce the size and then a drop of this suspension was dripped onto a 300 mesh copper grid with a holey support film.

Results

As shown in Table 4, the carbonization yield of INPLS after thermal treatment was 41.97%. In order to calculate the true carbonization yield of LS, the weight of iron nitrate as the catalyst needs to be deducted from the total weight of the INPLS. The carbonization yield of LS after the weight correction of iron nitrate was 22.63%.

TABLE 4

Carbonization yields of after thermal-treated INPLS.

| | Carbonization yield (%) | |
|---|---|---|
| Sample | After thermal treatment | After correcting for $Fe(NO_3)_3 \cdot 9H_2O$ |
| INPLS | 41.97 | 22.63 |

The crystalline quality and thickness of the prepared graphene layers were evaluated using Raman spectroscopy. The three Raman fingerprints of graphene are known as D peak at ~1350 cm$^1$, G peak at ~1580 cm$^1$, and G' (or named 2D) peak at ~2700 cm$^1$, respectively. The D peak, known as the defected band of graphene, is absent in well-ordered graphene, but exists in defected graphene or at the edge of a graphene samples. Thus, the D peak intensity can serve as a measure of crystalline quality or the degree of defects in graphene materials. The G peak is from in-plane vibration of sp$^2$ carbon atoms and is a doubly degenerate phonon mode at the Brillouin zone center. The G' peak originates from a two phonon double resonance Raman process, which is the most prominent feature in the Raman spectrum of graphene, its position, shape, and the intensity of G' to G ($I_G/I_G$) are often used to estimate the number of graphene layers. The G' peak of monolayer graphene is different from that of graphite. For monolayer graphene, the G' peak is a sharp and symmetric one at the lower shift, with intensity roughly 4 times that of the G peak. In bulk graphite, the G' peak is comprised of two components, the intensities of which are roughly ¼ and ½ that of the G peak for the low and high shifts, respectively. The G' peak becomes broader and blue-shifted when the graphene thickness increases from monolayer to multilayer, which is distinguishable from graphite.

Figure 11:
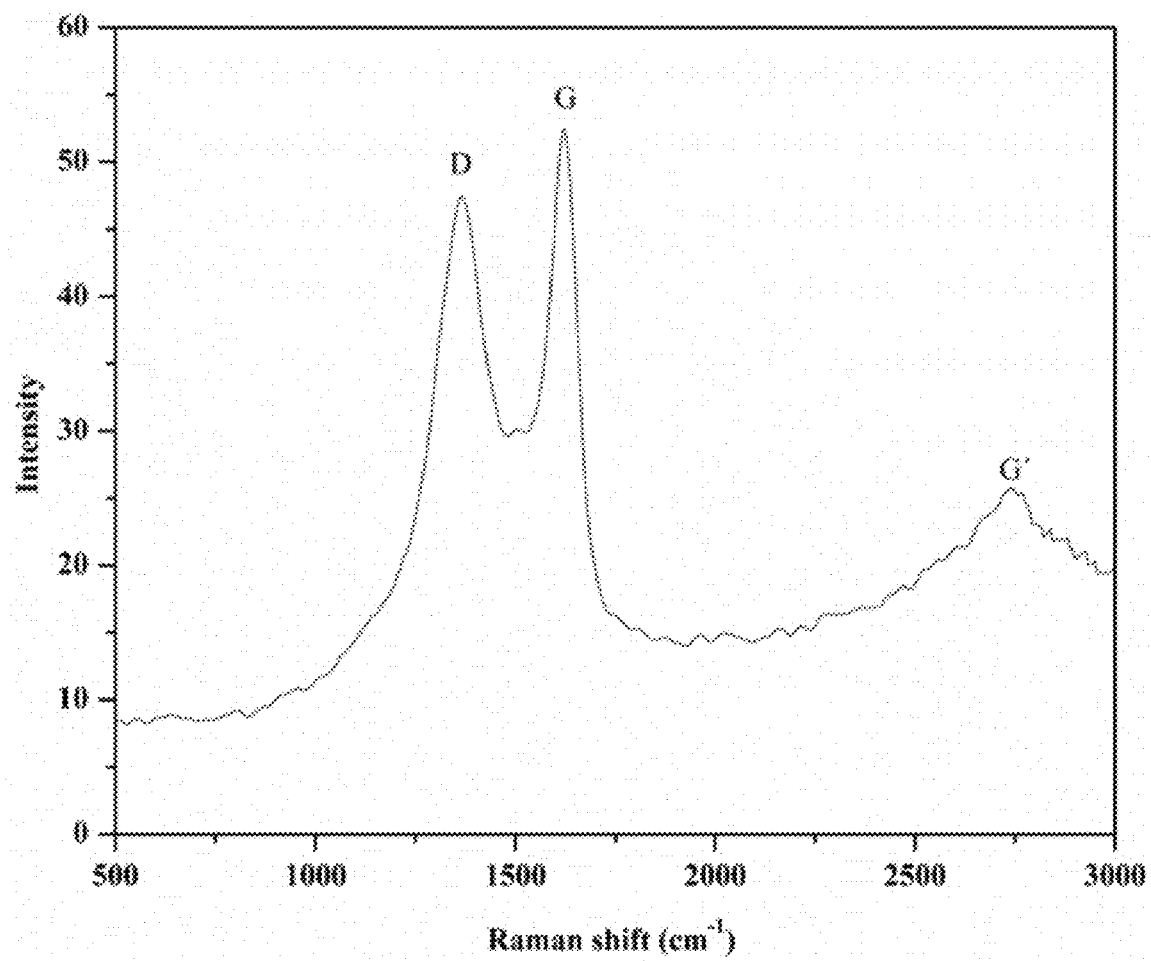
FIG. 11 includes a plot showing Raman spectra of thermal-treated iron nitrate promoted LS (INPLS).

Raman spectrum of the carbon species obtained from the procedures is depicted in FIG. 11. With a 532 nm Raman, there were two strong peaks, D and G peaks, which appeared around 1350 cm$^{-1}$ and 1580 cm$^{-1}$, respectively. The G peak in FIG. 11 indicates that graphene-like carbon structure may be formed in the carbon species, while the D peak represents some lattice defects present in the structure. There was a relatively weak and broad G' peak at 2730 cm$^{-1}$ on the spectrum, which displayed a shift to higher frequencies (blue-shift) than that of monolayer graphene (~2670 cm$^1$), and the shape and position of the G' peak provided evidence of graphene having a few-layers (5-10 layers) as the major product.

In principle, $I_G/I_G$ can be used to determine the number of layers in graphene sample, since $I_G/I_G$ is reduced with increasing the number of layers. The number of layers in few-layer graphene can be calculated if the parameters for the environmental effects are delineated. For more than 5 layers, the Raman spectrum becomes hardly distinguishable from that of graphite.

Figure 12:
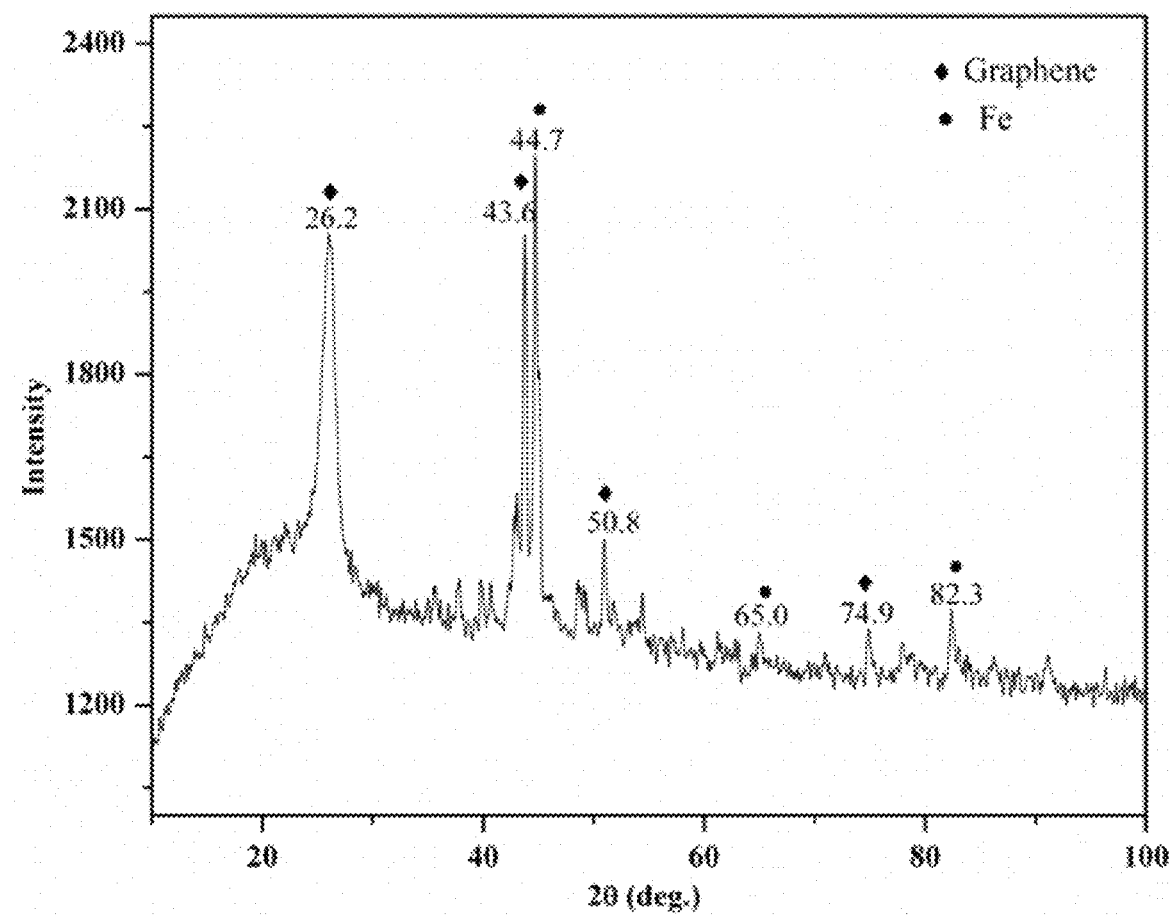
FIG. 12 includes a plot showing the XRD pattern of thermal-treated INPLS.

XRD analysis is shown in FIG. 12. The diffraction peaks of metallic Fe appear in FIG. 12 since the product was not purified to avoid structure damage. The presence of Fe was signified by the diffractions at 2θ=44.7°, 65.0°, and 82.3°. The peaks at 2θ=26.2° (002) and 50.8° (004) are characteristic of the parallel graphene layers, whereas the 43.6° (100) and 74.9° (110) diffraction peaks correspond to the 2D in-plane symmetry along the graphene sheets. These data are in consistence with the results described in literature which indicated that the four diffraction peaks of graphene balls are at 2θ=25° (002), 49.1° (004), 42.2° (100), and 72.8° (110), respectively. In XRD for few-layer graphene sheets, the four diffraction peaks can be at 2θ=26.2° (002), 54.4° (004), 42.5° (100), and 77.4° (110) respectively, and the XRD pattern of few-layer graphene showed two prominent characteristic peaks at 2θ=26.3° (002) and 43.2° (100). The XRD revealed that the prepared graphene has a relatively good crystallinity.

FIG. 13 shows the TEM images of the graphene, which varied in size between 40 nm and 80 nm. High-resolution TEM (FIG. 13C) depicts graphene nanosheets with 6 or 7 layers. The measured lattice space of this material was about 0.35 nm, which is in good agreement with the thickness of a mono-layer graphene (0.335 nm). The inset image in FIG.

13C, corresponding to the diffraction pattern of few-layer graphene, exhibited the hexagonally arranged lattice of carbon in graphene.

Figure 13A:
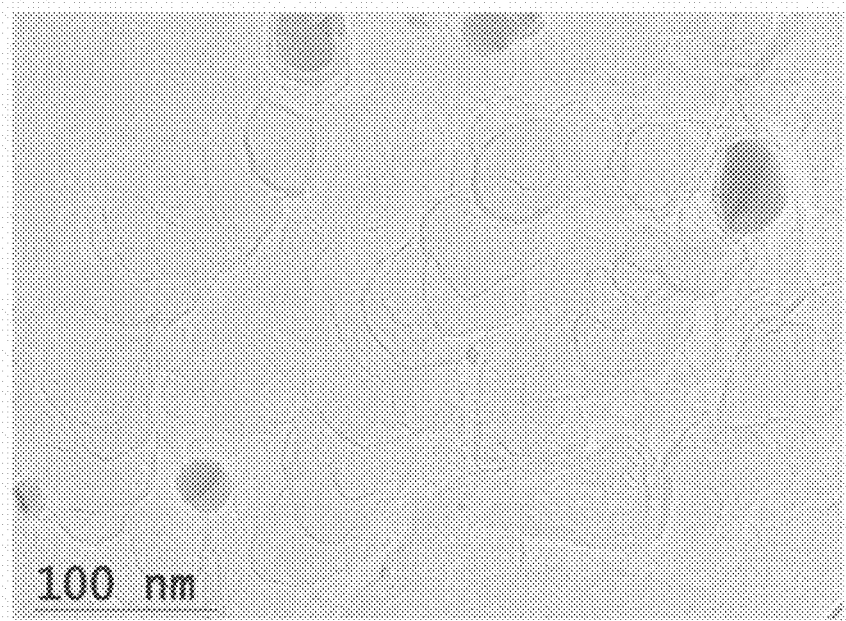
FIGS. 13A to 13D includes transmission electron microscope microscopy (TEM) images showing thermal-treated INPLS, where the inset images in FIGS. 13C and 13D are electron diffraction patterns.
Figure 13B:
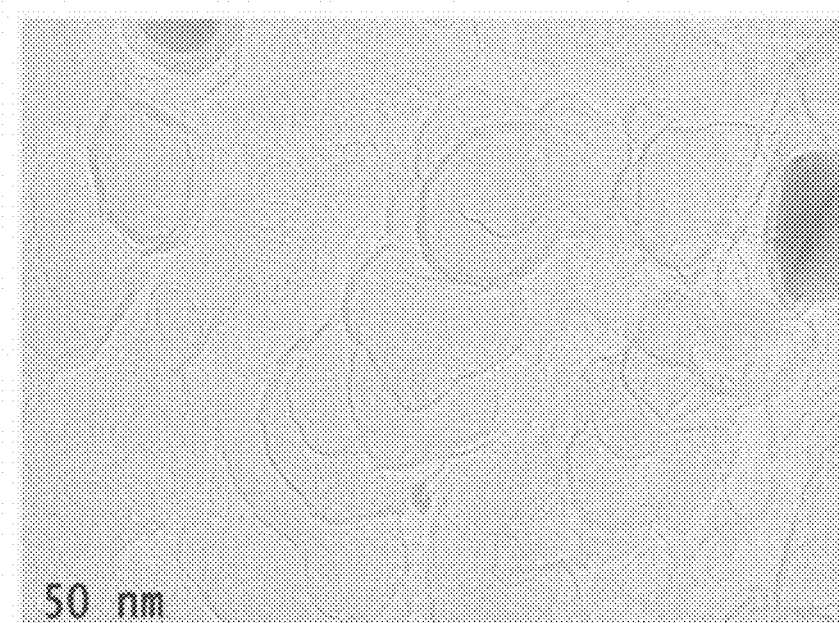
Figure 13C:
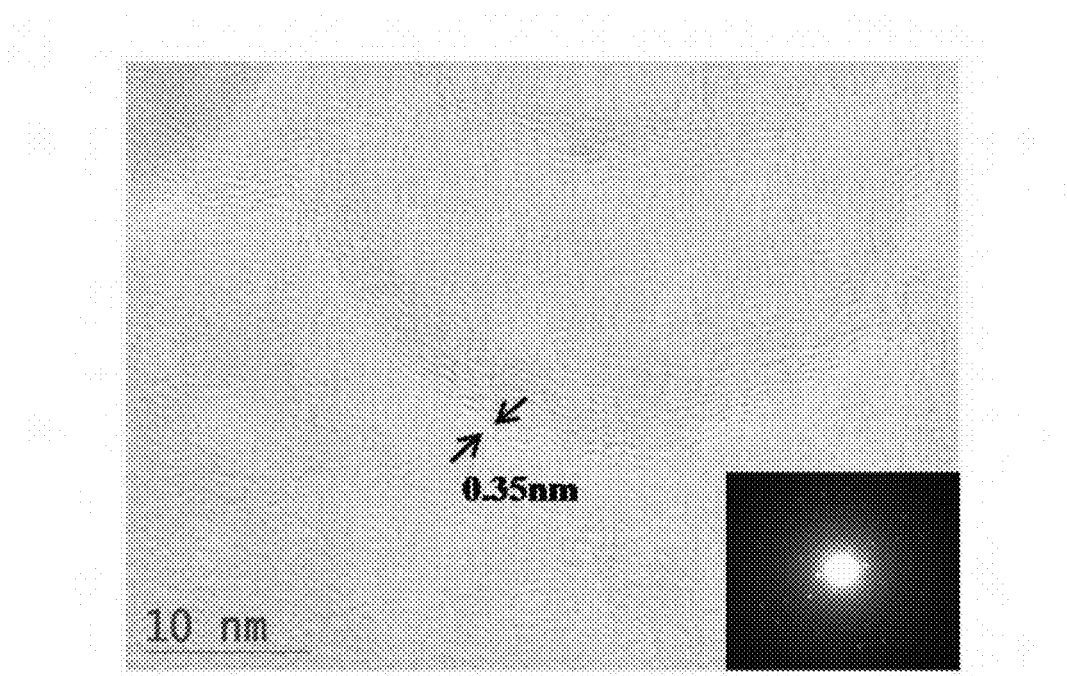
Figure 13D:
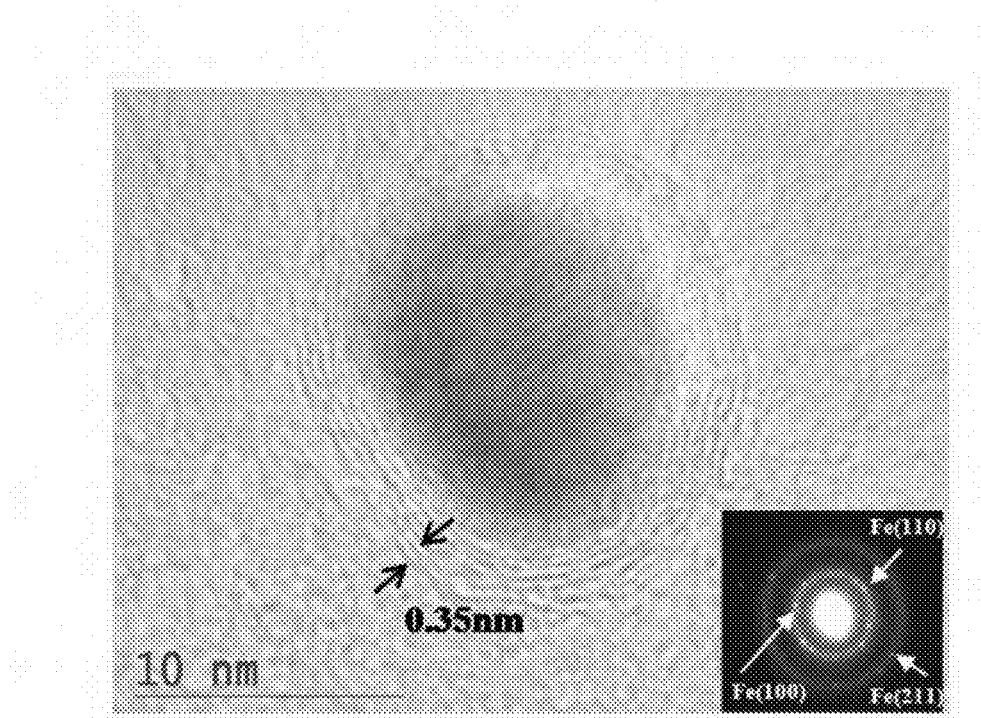

Several Fe-cored onion-like carbon structures are observed in FIGS. 13A and 13B because of no purification for the product, as shown in the high-resolution TEM image in FIG. 13D. The inset of FIG. 13D shows Fe crystals, in which the Fe zone axis is illustrated. There were 6 or 7 layers and interlayer spacing of carbon shell in the onion structure was about 0.35 nm, consistent with the results obtained from FIG. 13C.

Without being bound by theory or mechanism, iron nitrate may affect the stacking shape of $sp^2$ carbon atoms from lignin. Furthermore, the retention time of $sp^2$ carbon atoms in the reaction was not enough to form graphite (multi-layer graphene sheets), possibly because of the high flow rate of the shielding gas.

Example 4

This Example describes a process for synthesizing graphene from kraft lignin. The same materials and methods set forth in Example 1 were repeated in this Example, except that LS was replaced with kraft lignin.

Figure 14:
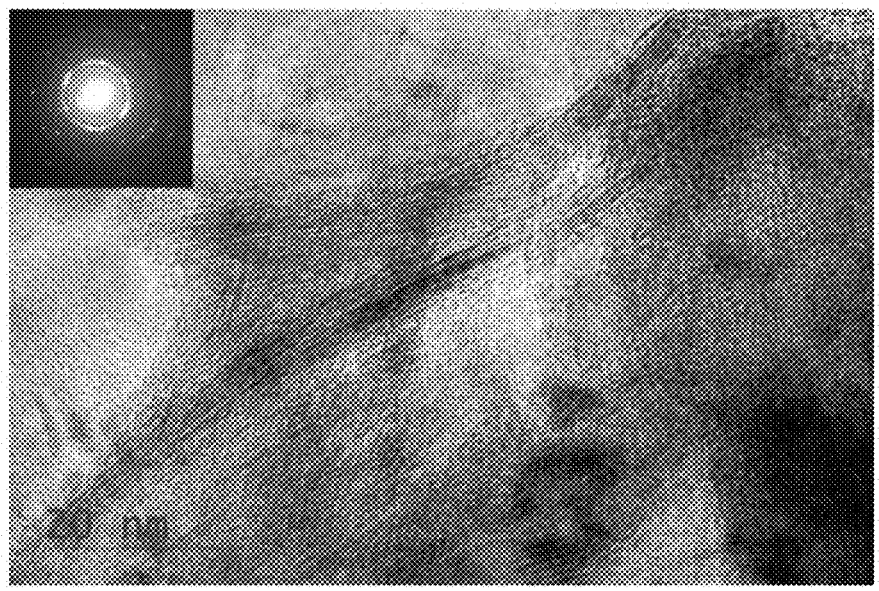
FIG. 14 includes a TEM image of kraft lignin carbonization products without iron particles showing about 6 to about 10 graphene layers with different orientations.
Figure 15:
FIG. 15 includes a TEM image of kraft lignin carbonization products without iron particles showing about 2 to about 4 graphene layers with uniform orientations.
Figure 16:
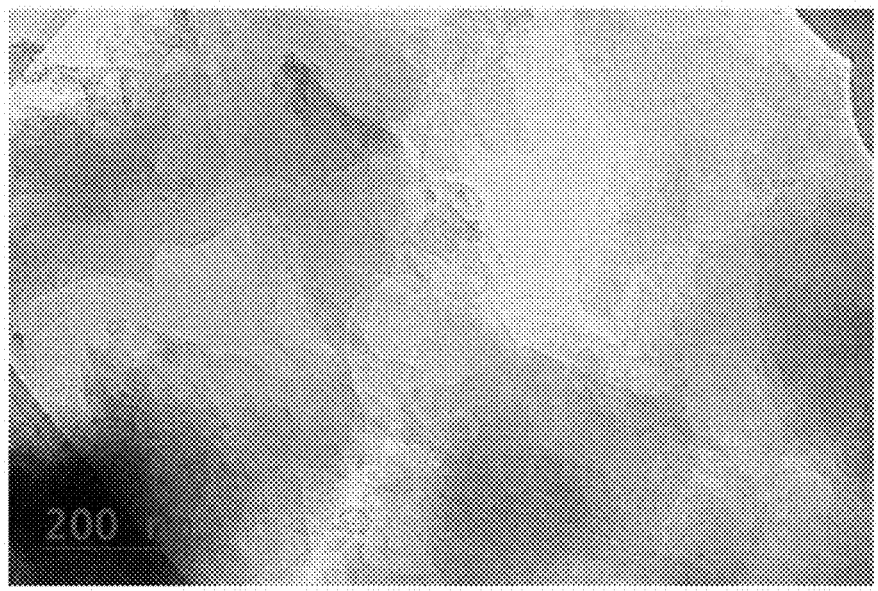
FIG. 16 includes a lower magnification TEM image of kraft lignin carbonization products without iron particles showing a single layer and about 2 to about 20 graphene layers.
Figure 17:
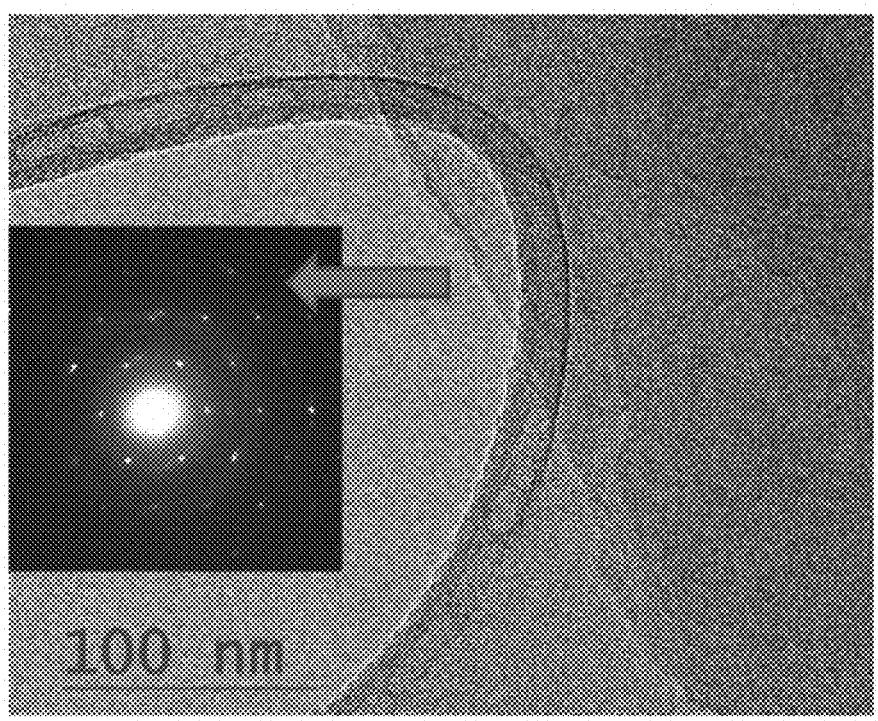
FIG. 17 includes a TEM image of kraft lignin carbonization products with 3% iron particles showing multiple graphene layers with uniform orientations.

As shown in FIGS. 14 to 16, carbonization products of kraft lignin were synthesized without iron particles. Single layer graphene and multiple-layers graphene were observed. The graphene layers with a layer space of 0.34 nm and electron diffraction patterns showed multiple layers of graphene with a uniform orientation (FIG. 15). In other instances the multiple graphene layers had different orientations (FIG. 14). As shown in FIG. 17, the carbonization products of kraft lignin with 3 wt % iron particles included multiple-layer graphene with a uniform orientation.

Example 5

This Example describes a process for synthesizing graphene from kraft lignin. The same materials and methods set forth in Example 3 were repeated in this Example, except that LS was replaced with kraft lignin.

Figure 18:
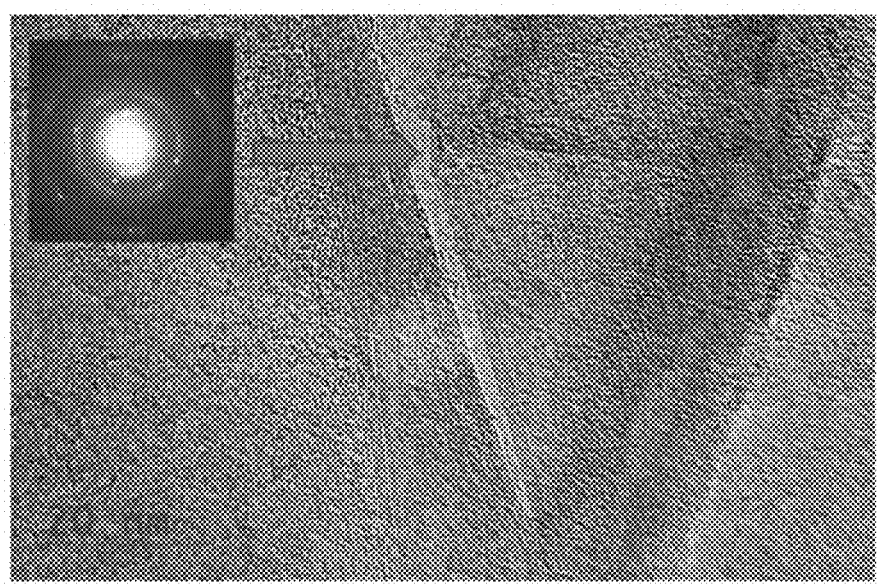
FIG. 18 includes a TEM image of kraft lignin carbonization products with 25% iron nitrate showing about 3 to about 6 graphene layers.
Figure 19:
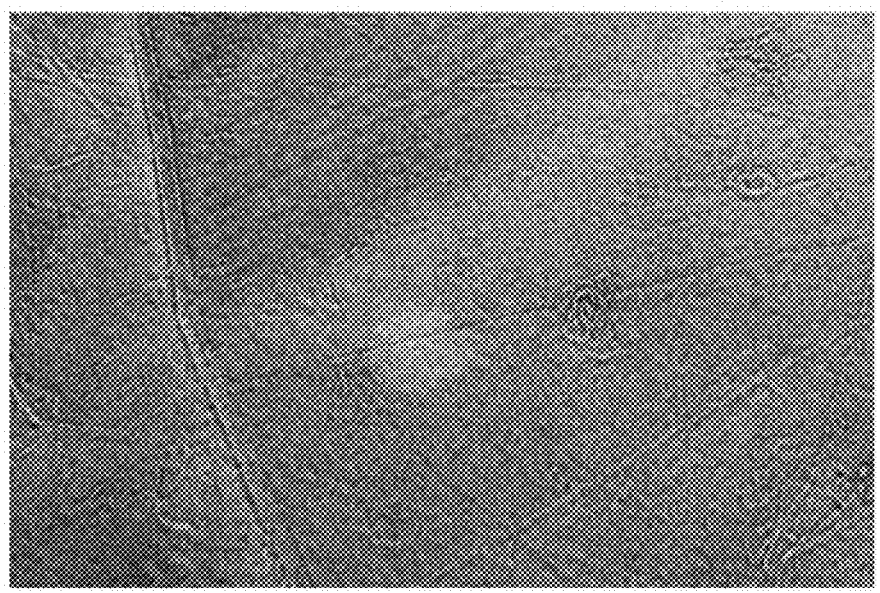
FIG. 19 includes a TEM image of kraft lignin carbonization products with 25% iron nitrate showing about 5 graphene layers.
Figure 20:
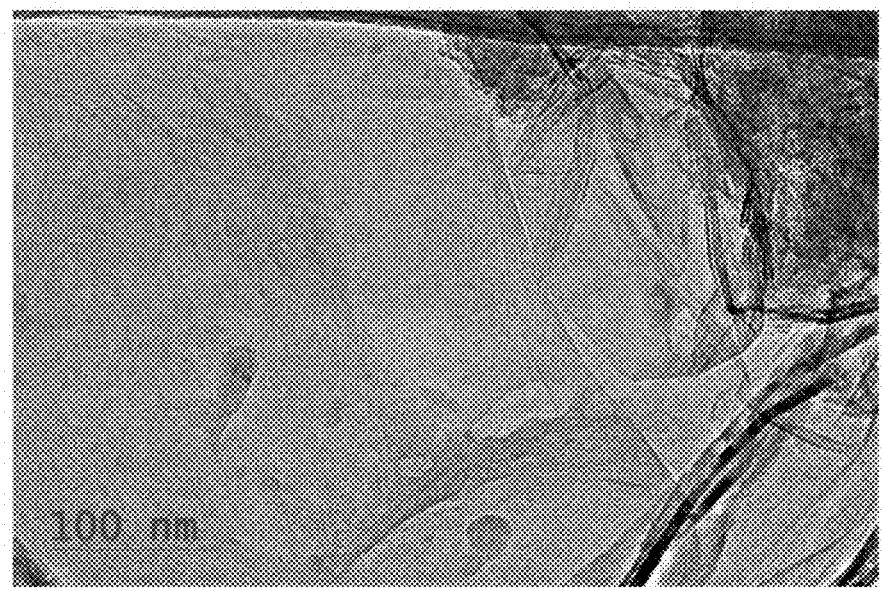
FIG. 20 includes a lower magnification TEM image of kraft lignin carbonization products with 25% iron nitrate showing about multiple graphene layers.
Figure 21:
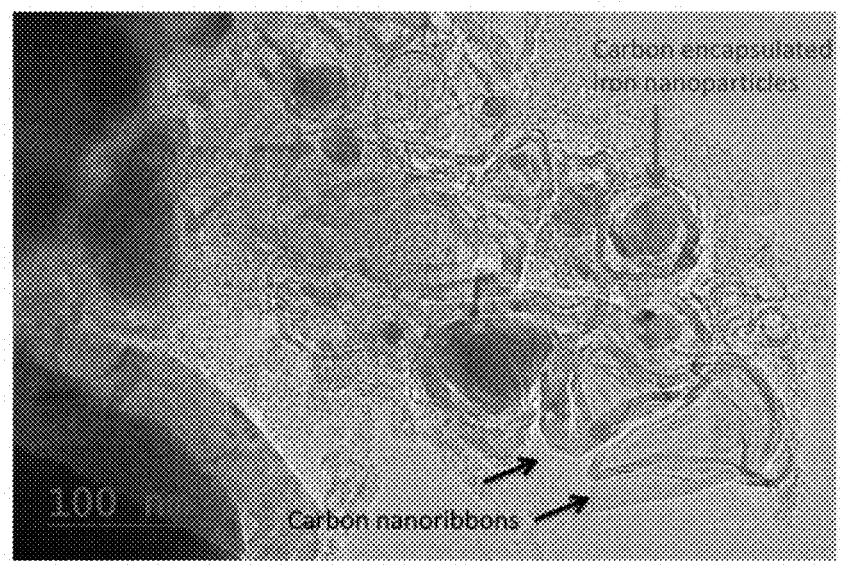
FIG. 21 includes a TEM image of kraft lignin carbonization products with 25% iron nitrate showing carbon encapsulated iron nanoparticles and carbon nanoribbons.

As shown in FIGS. 18 to 20, carbonization products of kraft lignin were synthesized with 25% iron nitrate. Multiple-layer graphene was synthesized in this Example. The graphene layers had a layer space of 0.34. Additionally, as shown in FIG. 21, encapsulated iron nanoparticles and carbon nanoribbons were also synthesized from the kraft lignin.

In view of the above, it will be seen that the several advantages of the disclosure are achieved and other advantageous results attained. As various changes could be made in the above methods without departing from the scope of the disclosure, it is intended that all matter contained in the above description and shown in the accompanying drawings shall be interpreted as illustrative and not in a limiting sense.

REFERENCES

Throughout this document, various references are mentioned. All such references, including those listed below, are incorporated herein by reference.

Aboulkas, A., El Harfi, K., 2008. Study of the kinetics and mechanisms of thermal decomposition of Moroccan tarfaya oil shale and its kerogen. Oil Shale, 25, 426-443.

Brebu, M., Vasile, C., 2010. Thermal degradation of lignin—a review. Cellulose Chem. Technol., 44, 353-363.

Brebu, M., Cazacu, G., Chirila, O., 2011. Pyrolysis of lignin—a potential method for obtaining chemicals and/or fuels. Cellulose Chem. Technol., 45, 43-50.

Caballero, J. A., Font, R., Marcilla A., 1996. Study of the primary pyrolysis of Kraft lignin at high heating rates: yields and kinetics. J. Anal. Appl. Pyrol., 36, 159-178.

Cao, J., Xiao, G., Xu, X., Shen, D. K., Jin, B. S., 2013. Study on carbonization of lignin by TG-FTIR and high-temperature carbonization reactor. Fuel Processing Technol., 106, 41-47.

Cordero, T., Rodriguez-Maroto, J. M., Rodriguez-Mirasol, J., Rodriguez J. J., 1990. On the kinetics of thermal decomposition of wood and wood components. Thermpchim. Acta, 164, 135-144.

Gao, Y., Yue, Q. Y., Gao, B. Y., Sun, Y. Y., Wang, W. Y., Li, Q., Wang, Y., 2013. Preparation of high surface area-activated carbon from lignin of papermaking black liquor by KOH activation for Ni(II) adsorption. Chem. Eng. J., 217, 345-353.

Gonzalez-Serrano, E., Cordero, T., Rodríguez-Mirasol, J., Rodríguez J. J., 1997. Development of porosity upon chemical activation of kraft lignin with ZnCl2. Ind. Eng. Chem. Res., 36, 4832-4838.

Hu, J., Xiao, R., Shen, D. K., Zhang, H. Y., 2013. Structual analysis of lignin residue from black liquor and its thermal performance in thermogravimetric-fourier transform infrared spectroscopy. Bioresour. Technol., 128, 633-639.

Jones, L. E., Thrower, P. A., 1991. Influence of boron on carbon fiber microstructure, physical properties, and oxidation behavior. Carbon, 29, 251-269.

Kumar, M. N. S., Mohanty, A. K., Erickson, L., Misra, M., 2009. Lignin and its applications with polymers. Journal of BiobasedMaterials and Bioenergy, 3, 1-24.

Mun, S. P., Cai, Z. Y., Zhang J. L., 2013. Fe-catalyzed thermal conversion of sodium lignosulfonate to graphene. Materials Letters, 100, 180-183.

Liou, Y. J., Huang, W. J., 2013. Quantitative analysis of graphene sheet content in wood char powders during catalytic pyrolysis. J. Mater. Sci. Technol., 29, 406-410.

Lora, J. H., Glasser, W. G., 2002. Recent industrial applications of lignin: a sustainable alternative to non-renewable materials. J. Polym. Environ. 10, 39-48.

Qin, W., Kadla, J. F., 2012. Carbon fibers based on pyrolytic lignin. J. Appl. Polym. Sci. 126, E203-E212.

Rodríguez-Mirasol, J., Cordero, T., Rodríguez, J. J., 1996. High-temperature carbons from kraft lignin. Carbon, 34, 43-52.

Savova, D., Apak, E., Ekinci, E., Yardim, F., PEtrov, N., Budinova, T., Razvigorova, M., Minkova, V., 2001. Biomass conversion to carbon adsorbents and gas. Biomass and Bioenergy, 21, 133-142.

Sharma, R. K., Wooten, J. B., Baliga, V. L., Lin, X. H., 2004. Characterization of chars from pyrolysis of lignin. Fuel, 83, 1469-1482.

Stewart D., 2008. Lignin as a base material for materials applications: chemistry, application and economics. Ind. Crop. Prod., 27, 202-207.

Suhas; Carrott, P. J. M., Ribeiro Carrott, M. M. L., 2007. Lignin—from natural adsorbent to activated carbon: a review. Bioresour. Technol., 98, 2301-2312.

Suzuku, T., Yamada, T., Okazaki, N., Tada, A., Nakanishi, M., Futamata, M., Chen, H. T., 2001. Electromagnetic shielding capacity of wood char loaded with nickel. Mater. Sci. Res. Int., 7, 206-212.

Wen, J. L., Xue, B. L., Xu, F., Sun, R. C., Pinkert, A., 2013. Unmasking the structural features and property of lignin from bamboo. Ind. Crop. Prod., 42, 332-343.

Xiao, G., Liu, J. C., Jin, B. S., 2010. Characteristics of rice straw and hull charcoal by high-temperature carbonization. J. Comb. Sci. Technol., 29, 1220-1225.

What is claimed is:

1. A method of synthesizing carbon nanomaterials, the method comprising:
    mixing a lignin and/or source thereof and a catalyst to form a mixture, wherein the lignin and/or source thereof is a kraft lignin;
    heating the mixture at a temperature of at least 600° C. for at least 30 minutes;
    cooling the heated mixture to form a cooled mixture including graphene nanomaterials; and
    following the cooling step, purifying the mixture to increase a concentration of carbon nanomaterials in the cooled mixture.

2. The method of claim 1, wherein the catalyst is selected from a platinum-containing catalyst, a nickel-containing catalyst, an iron-containing catalyst, and combinations thereof.

3. The method of claim 2, wherein the catalyst is comprised of nanoparticles.

4. The method of claim 1, wherein the catalyst includes iron nanoparticles, iron nitrate, or a combination thereof.

5. The method of claim 1, wherein the lignin and/or source thereof and catalyst are in a weight ratio of from about 1:1 to about 8:1.

6. The method of claim 5, wherein the lignin and/or source thereof and catalyst are in a weight ratio of about 4:1.

7. The method of claim 1, wherein the heating is conducted at a temperature of from about 600° C. to about 1500° C.

8. The method of claim 7, wherein the heating is conducted at a temperature of about 1000° C.

9. The method of claim 1, wherein the heating is conducted under an inert atmosphere.

10. The method of claim 1, wherein the heating is conducted for a period of from about 30 minutes to about 120 minutes.

11. The method of claim 1, wherein the cooling is conducted under an inert atmosphere.

12. The method of claim 1, wherein, in the cooling step, the mixture is cooled to a temperature of less than about 100° C.

13. The method of claim 1, wherein the purifying step includes purifying the mixture with water, an acid, or a combination thereof.

14. A method of synthesizing carbon nanomaterials, the method comprising:
    mixing a kraft lignin and iron nanoparticles to form a mixture;
    heating the mixture at a temperature of about 80° C. to about 1200° C. for about 40 minutes to about 80 minutes under an inert atmosphere; and
    cooling the heated mixture to a temperature of less than about 100° C. under an inert atmosphere to form a cooled mixture including graphene.

15. The method of claim 14, wherein the iron nanoparticles have a diameter of less than about 100 nanometers.

16. The method of claim 14, wherein the kraft lignin and iron nanoparticles are present in a weight ratio of about 4:1.

17. A method of synthesizing carbon nanomaterials, the method comprising:
    mixing a kraft lignin feedstock and an iron-containing catalyst to form a mixture;
    heating the mixture at a temperature of about 80° C. to about 1200° C. for about 40 minutes to about 80 minutes under an inert atmosphere; and
    cooling the heated mixture to room temperature under an inert atmosphere to form a cooled mixture including graphene.

18. The method of claim 1, wherein the graphene nanomaterial is carbon encapsulated iron nanoparticles.

19. The method of claim 14, wherein the graphene nanomaterial is carbon encapsulated iron nanoparticles.

20. The method of claim 17, wherein the graphene nanomaterial is carbon encapsulated iron nanoparticles.

* * * * *